(12) United States Patent
Song et al.

(10) Patent No.: US 9,847,013 B2
(45) Date of Patent: Dec. 19, 2017

(54) MOBILE TERMINAL AND METHOD FOR CONTROLLING SAME

(71) Applicant: LG ELECTRONICS INC., Seoul (KR)

(72) Inventors: Yoomee Song, Seoul (KR); Miyoung Kim, Seoul (KR); Jiyoun Lee, Seoul (KR); Younghoon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 14/914,105

(22) PCT Filed: Aug. 12, 2014

(86) PCT No.: PCT/KR2014/007498
§ 371 (c)(1),
(2) Date: Feb. 24, 2016

(87) PCT Pub. No.: WO2015/034186
PCT Pub. Date: Mar. 12, 2015

(65) Prior Publication Data
US 2016/0284200 A1    Sep. 29, 2016

(30) Foreign Application Priority Data

Sep. 9, 2013 (KR) .......................... 10-2013-0107932

(51) Int. Cl.
*G08B 21/00* (2006.01)
*G08B 21/24* (2006.01)
(Continued)

(52) U.S. Cl.
CPC ............ *G08B 21/24* (2013.01); *G06F 1/163* (2013.01); *G06F 3/011* (2013.01);
(Continued)

(58) Field of Classification Search
CPC combination set(s) only.
See application file for complete search history.

(56) References Cited

U.S. PATENT DOCUMENTS 7,836,400 B2 * 11/2010 May .................... G06Q 10/109
345/501
8,438,127 B2    5/2013 Kurata et al.
(Continued)

FOREIGN PATENT DOCUMENTS

KR    10-2001-0092330 A    10/2001
KR    10-2011-0043177 A     4/2011
(Continued)

OTHER PUBLICATIONS

International Search Report dated Nov. 21, 2014 issued in Application No. PCT/KR2014/007498.
(Continued)

*Primary Examiner* — Travis Hunnings
(74) *Attorney, Agent, or Firm* — KED & Associates, LLP

(57) ABSTRACT

Disclosed is a watch-type mobile terminal that a user can wear on the user's wrist. The mobile terminal according to the present invention may comprise: a display unit configured to display information; a sensing unit configured to detect movement of the mobile terminal; a memory configured to store behavior pattern data of the user for each time slot; and a controller configured to generate the behavior pattern data on the basis of detection signals of the sensing unit, and recommend, on the basis of the behavior pattern data, a behavior that needs to be performed by the user if the time when a predetermined behavior is expected to occur is reached, or the occurrence of the predetermined behavior is not detected although the time when the predetermined behavior is expected to occur has passed.

17 Claims, 34 Drawing Sheets

(51) Int. Cl.
*G06F 17/00* (2006.01)
*G06F 3/0354* (2013.01)
*G06F 1/16* (2006.01)
*G06F 3/01* (2006.01)
*G08B 21/18* (2006.01)
*H04M 1/725* (2006.01)

(52) U.S. Cl.
CPC .......... *G06F 3/03546* (2013.01); *G06F 17/00* (2013.01); *G08B 21/182* (2013.01); *H04M 1/7253* (2013.01); *H04M 1/72566* (2013.01); *H04M 1/72569* (2013.01); *H04M 1/72572* (2013.01); *H04M 2250/10* (2013.01); *H04M 2250/12* (2013.01)

(56) References Cited

U.S. PATENT DOCUMENTS

| | | | |
|---|---|---|---|
| 2004/0243257 A1 | 12/2004 | Theimer | |
| 2007/0229517 A1* | 10/2007 | May | G06Q 10/109 345/501 |
| 2012/0253489 A1* | 10/2012 | Dugan | A63B 71/0622 700/91 |
| 2013/0145024 A1* | 6/2013 | Cao | H04L 67/22 709/224 |
| 2015/0066174 A1* | 3/2015 | Dugan | A63B 71/0622 700/91 |
| 2015/0223705 A1* | 8/2015 | Sadhu | G01S 19/17 600/301 |
| 2016/0125163 A1* | 5/2016 | Brianza | G06F 19/3418 705/2 |

FOREIGN PATENT DOCUMENTS

| | | |
|---|---|---|
| KR | 10-2012-0111330 A | 10/2012 |
| KR | 10-2013-0081063 A | 7/2013 |
| WO | WO 2011/110897 | 9/2011 |
| WO | WO 2013/086363 A2 | 6/2013 |

OTHER PUBLICATIONS

European Search Report dated Mar. 13, 2017 issued in Application No. 14842861.8.

* cited by examiner

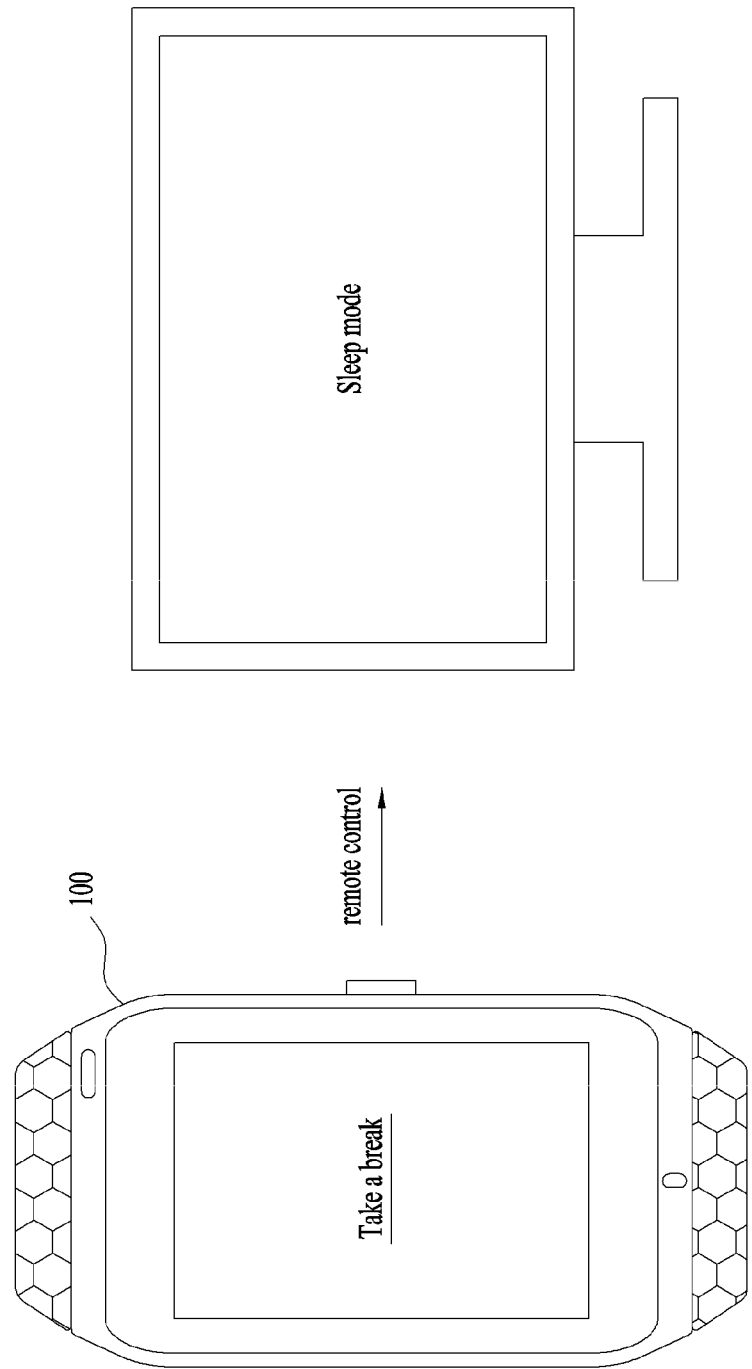

MOBILE TERMINAL AND METHOD FOR CONTROLLING SAME

CROSS-REFERENCE TO RELATED PATENT APPLICATIONS

This application is a U.S. National. Stage Application under 35 U.S.C. §371 of PCT Application No. PCT/KR2014/007498, flied Aug. 12, 2014, which claims priority to Korean Patent Application No 10-2013-0107932, filed Sep. 9, 2013, whose entire disclosures are hereby incorporated by reference.

TECHNICAL FIELD

The present invention relates to a mobile terminal and a method of controlling the mobile terminal, and more particularly, to a mobile terminal of a watch-type capable of recommending an action to be performed according to a behavior pattern of a user and a method of controlling the mobile terminal.

BACKGROUND ART

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

In order to more increase mobility of a mobile terminal, a mobile terminal of a wearable form capable of being worn on a wrist is developing. A mobile terminal of a watch-type is different from a general mobile terminal in that the watch-type mobile terminal corresponds to a wearable device. In particular, the mobile terminal of watch-type may correspond to a lifelogging device continuously carried by a user on a body of the user.

If the mobile terminal of watch-type is combined with a life pattern based on a point that the mobile terminal of watch-type is always worn on a body of a user, it may be more useful.

DISCLOSURE OF THE INVENTION

Technical Tasks

One object of the present invention is to provide a mobile terminal enhancing user convenience.

Specifically, one objective of the present invention is to provide a mobile terminal capable of automatically identifying a behavior pattern of a user based on user behavior information collected by the mobile terminal of a watch-type.

Another object of the present invention is to provide a mobile terminal capable of recommending a user to perform an appropriate action according to a time slot based on a behavior pattern of the user.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a mobile terminal of watch-type capable of being worn on a wrist of a user can include a display unit configured to display information, a sensing unit configured to detect movement of the mobile terminal, a memory configured to store a behavior pattern data of the user according to a time slot and if time on which a prescribed action is expected to occur is arrived or occurrence of the prescribed action is not detected based on the behavior pattern data although the time on which the prescribed action is expected to occur is passed away, a controller configured to recommend an action to be performed by the user.

To further achieve these and other advantages and in accordance with the purpose of the present invention, according to a different embodiment, a method of controlling a mobile terminal of watch-type capable of being worn on a wrist of a user can include the steps of collecting behavior information of the user from a sensing unit, generating a behavior pattern data of the user according to a time slot by analyzing the behavior information of the user, and if time on which a prescribed action is expected to occur is arrived or occurrence of the prescribed action is not detected based on the behavior pattern data although the time on which the prescribed action is expected to occur is passed away, recommending an action to be performed by the user.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to the present invention, it is able to provide a mobile terminal enhancing user convenience.

Specifically, according to the present invention, it is able to provide a mobile terminal capable of automatically identifying a behavior pattern of a user based on user behavior information collected by the mobile terminal of a watch-type.

According to the present invention, it is able to provide a mobile terminal capable of recommending a user to perform an appropriate action according to a time slot based on a behavior pattern of the user.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIGS. 17a and 17b are diagrams for examples of outputting a guide screen to recommend a user to take a rest.

BEST MODE

Mode for Invention

The mobile terminal according to current invention will be described with the accompanying drawings.

As used herein, the suffixes 'module', 'unit' and 'part' are used for elements in order to facilitate the disclosure only.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
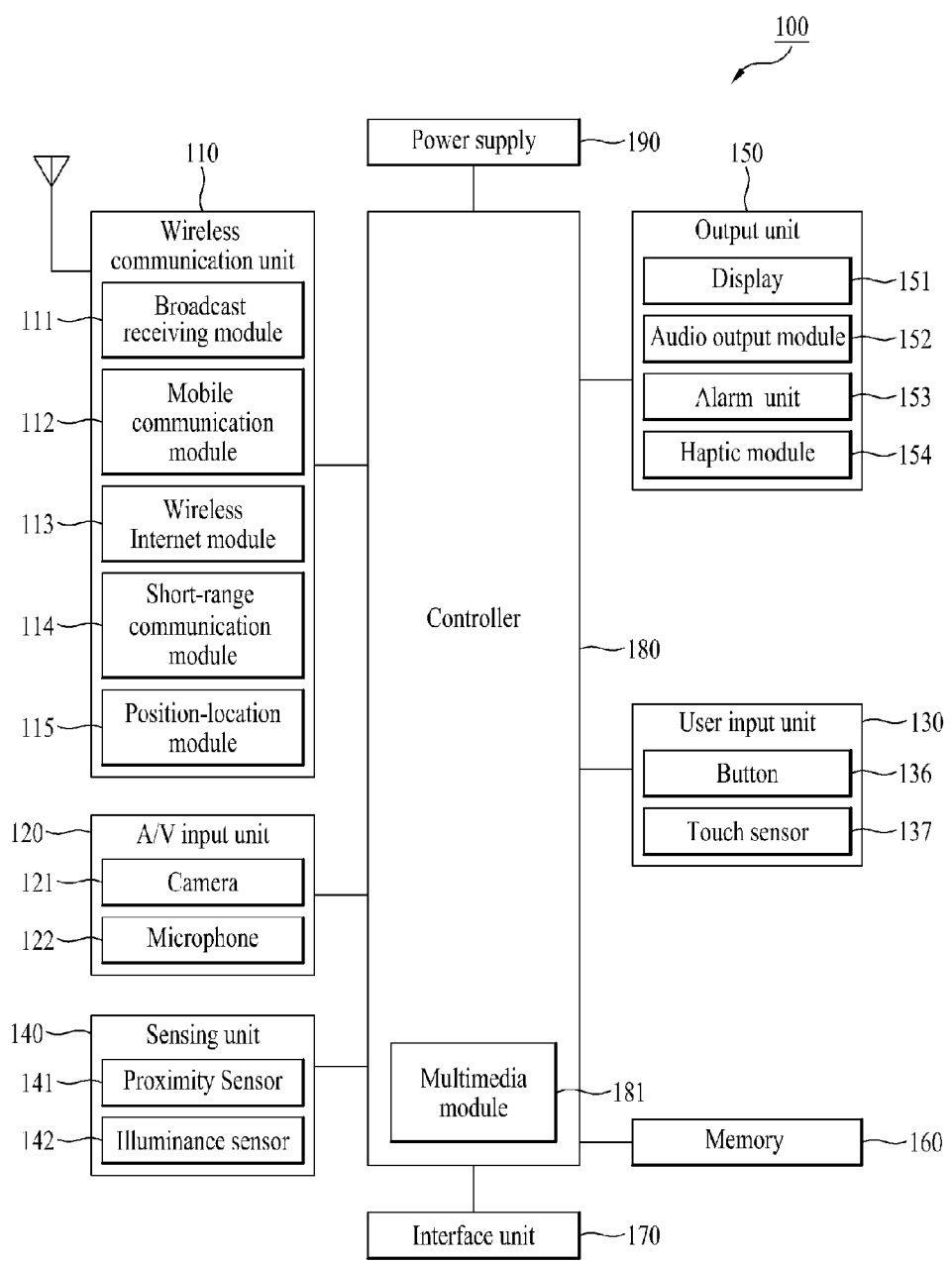
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
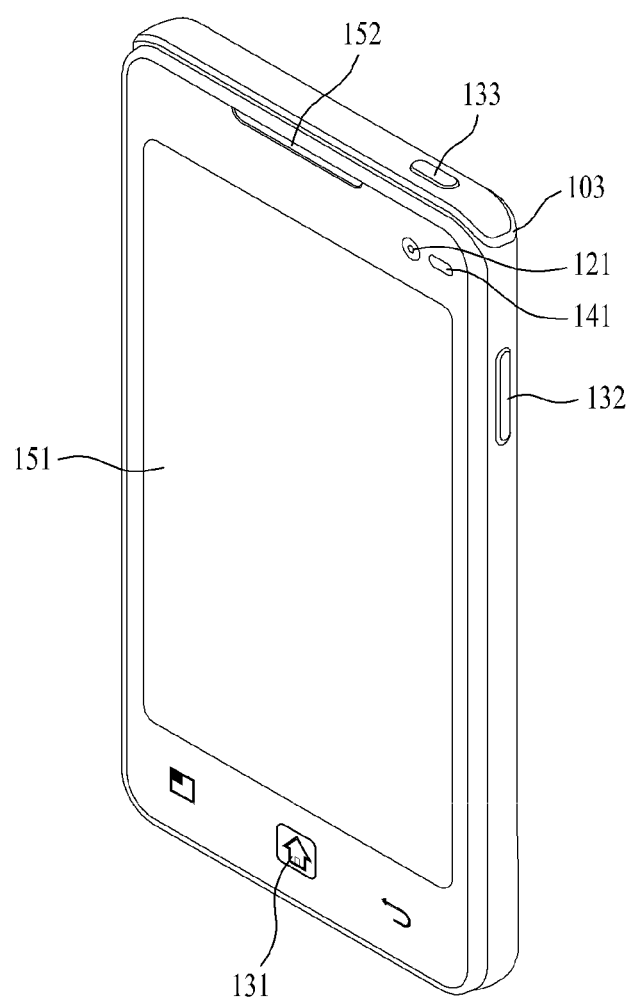
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to a third manipulating unit 133.

Figure 3:
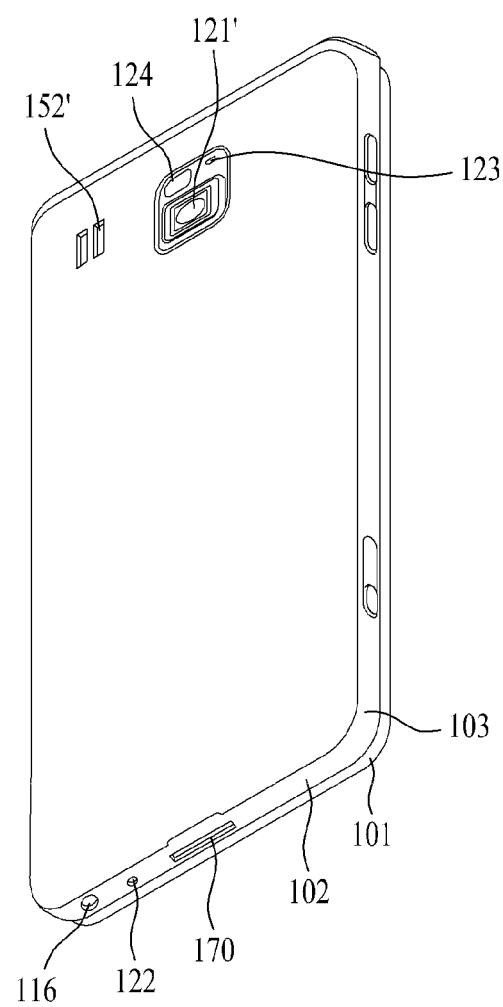
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speaker-phone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 configured to supply power to a mobile terminal 100 is installed in a terminal body. The power supply unit 190 is installed in the inside of the terminal body or can be removable from the external of the terminal body.

A touch pad 135 configured to detect a touch can be additionally installed in a rear case 102. The touch pad 135 can be configured by a light penetration type for a display unit 151. In this case, if both sides (i.e., both directions of a front side and a rear side of a mobile terminal) of the display unit 151 are configured to output visual information, it may also be able to recognize the visual information via the touch pad 135. All of the information outputted on both sides can be controlled by the touch pad 135.

Meanwhile, if a display dedicated to the touch pad 135 is separately installed, a touch screen can also be arranged at the rear case 102.

The touch pad 135 works in a manner of being interrelated with the display unit 151 of a front case 101. The touch pad 135 can be horizontally arranged at a rear side of the display unit 151. The touch pad 135 may have a size equal to or smaller than a size of the display unit 151.

Figure 4:
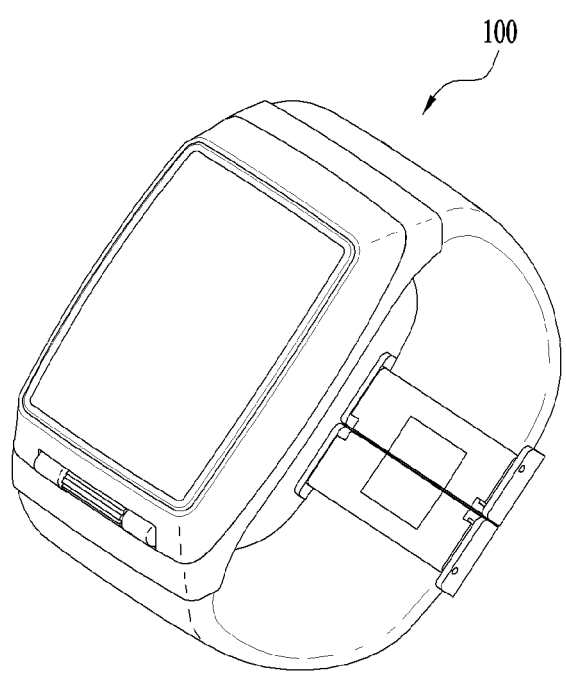
FIG. 4 is a diagram for an example of a mobile terminal of a watch-type.

The mobile terminal 100 explained in the present invention can be implemented by a watch-type capable of being worn on a wrist of a user. As an example, FIG. 4 is a diagram for an example of a mobile terminal 100 of a watch-type.

The mobile terminal 100 of a watch-type can also include components shown in FIG. 1 as it is. In the following embodiments, for clarity, assume that the mobile terminal 100 of watch-type includes a wireless communication unit 110, a camera 121, a microphone 122, a memory 160, a sensing unit 140 and a controller 180 among the components shown in FIG. 1. Yet, this is just for clarity of explanation. Hence, it does not mean that the listed components should be mandatorily included in the mobile terminal 100 of watch-type. A part of the listed components can be included in the mobile terminal 100 of watch-type or the remaining components except the listed components can be included in the mobile terminal 100 of watch-type.

Among the listed components, the wireless communication unit 110, the microphone 122 and the sensing unit 140 can be used to analyze at least one selected from the group consisting of a behavior pattern of a user, a status of the user and a health condition of the user wearing the mobile terminal 100 of watch-type. Specifically, a position-location module 115 of the wireless communication unit 110 can be used to identify a current position of the mobile terminal, i.e., a current position of the user and the microphone 122 can be used to identify a current status of the user by analyzing a sound directly or indirectly produced by the user.

Moreover, the sensing unit 140 can be used to analyze at least one selected from the group consisting of a normal behavior pattern, a current status and a health condition of the user in a manner of detecting movement of the mobile terminal 100, speed (or acceleration) of the mobile terminal 100, muscle movement on a part (e.g., a wrist of the user) on which the mobile terminal 100 is worn, a temperature on a part on which the mobile terminal 100 is worn, a blood pressure on a part on which the mobile terminal 100 is worn, amount of moisture on a part on which the mobile terminal 100 is worn, and the like. To this end, the mobile terminal 100 of watch-type can include at least one selected from the group consisting of a sensor for detecting movement of the mobile terminal 100, a sensor for detecting speed (or acceleration) of the mobile terminal 100, a sensor for detecting muscle movement on a part (e.g., a wrist of the user) on which the mobile terminal 100 is worn, a sensor for detecting a temperature of a user, a sensor for measuring a heartbeat of a user, a sensor for measuring a blood pressure of a user and a sensor for measuring total body fluid of a user.

In addition, among the listed components, the display unit 151 may correspond to a flexible display of which a shape is not fixed and is capable of being freely bent. Hence, when the mobile terminal 100 of watch-type is worn on a wrist, the display unit 151 of the mobile terminal may have a form naturally bent in accordance with degree of bending of a part on which the mobile terminal is worn. Moreover, since the mobile terminal 100 according to the present invention can be more easily implemented when the display unit 151 corresponds to a touch screen, assume that the display unit 151 corresponds to a touch screen in the following embodiments.

When a mobile terminal 100 has a form of a watch, as a form of outputting feedback for event occurrence, a part (e.g., a wrist) on which the mobile terminal 100 is worn may be tightened. To this end, a mechanism capable of automatically control a length of a band unit by electric control of the controller 180 can be applied to the band unit. As an example, feedback of tightening a wrist by the band unit can be outputted in a manner that the band unit has a structural form capable of inserting/withdrawing at least a part of the band unit to/from a body unit on which main parts are mounted by a control of the controller 180.

Figure 5:
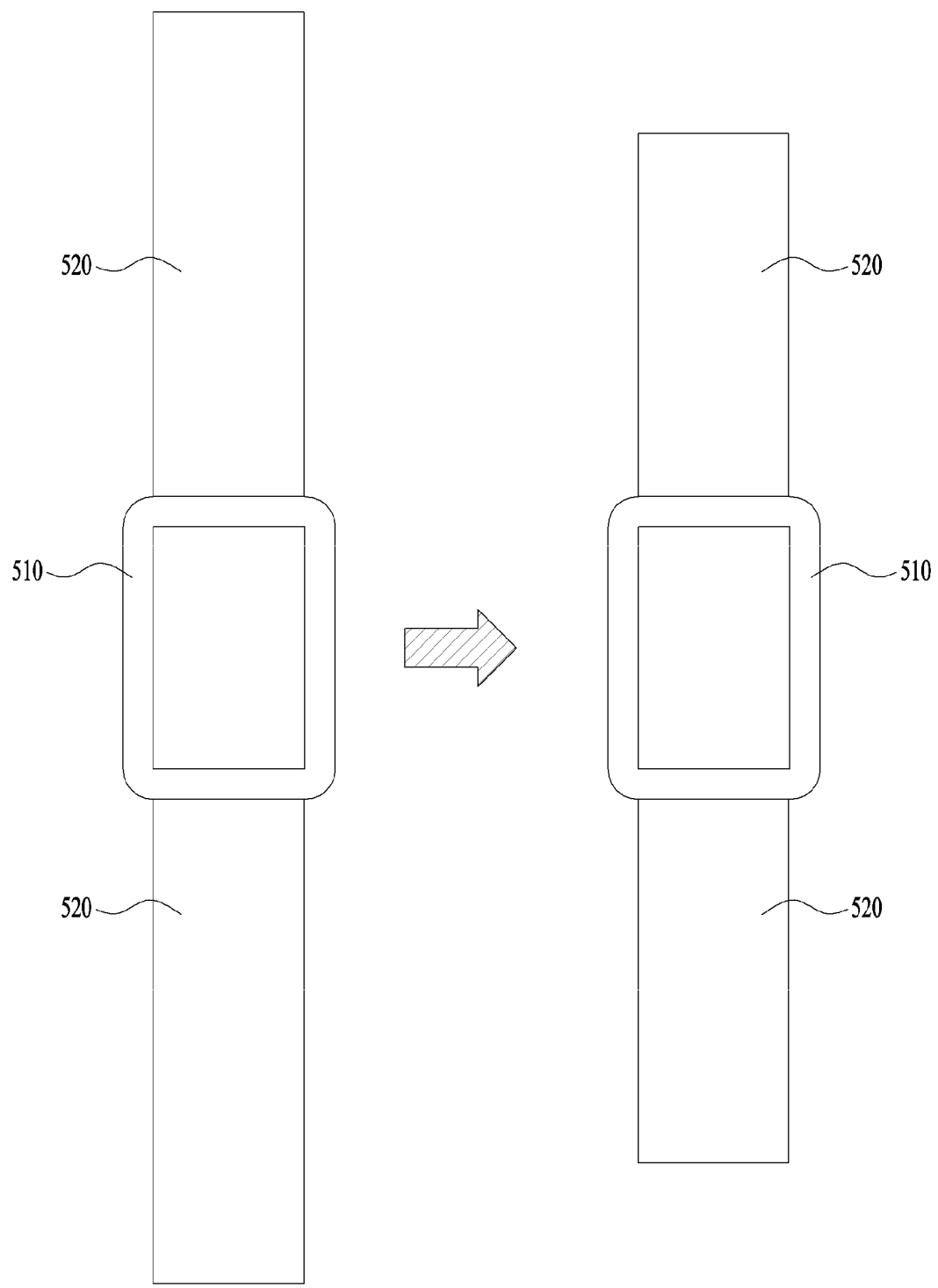
FIG. 5 is a diagram for an example of a mobile terminal of a watch-type capable of outputting feedback in a form of tightening a wrist.

As an example, FIG. 5 is a diagram for an example of a mobile terminal of a watch-type capable of outputting feedback using a form of tightening a wrist. As shown in an example of FIG. 5, when a wrist is tightened, the controller 180 controls a part of a band unit 520 to be inserted into a body unit 510 to enable the mobile terminal 100 to output feedback in a form of tightening a wrist of a user. Yet, in order to prevent the mobile terminal 100 from excessively tightening the wrist of the user, the controller 180 measures a pressure putting on the wrist of the user by the mobile terminal 100. If the pressure putting on the wrist of the user by the mobile terminal 100 is greater than a predetermined threshold value, the controller 180 can reduce strength (i.e., degree of inserting the band unit 520 into the body unit 510) of tightening the wrist. To this end, a sensor device (e.g., a pressure sensor) configured to measure a pressure can be mounted on a surface of the mobile terminal 100 of watch-type with which the wrist are contacted.

The mobile terminal 100 of watch-type according to the present invention can also be used to remotely control an external terminal. In this case, the external terminal may indicate such electronic devices capable of performing wireless communication as a TV, a computer, a home appliance and the like. The mobile terminal 100 of watch-type can transmit a control signal controlling an external terminal via short-range communication (e.g., IrDA, NFC, Bluetooth, Zigbee or the like). In case of an external terminal accessed an identical network (e.g., identical AP (access point)), the mobile terminal can transmit a control signal via the network. As a different example, the mobile terminal 100 of watch-type may access a server (e.g., home automation server) responsible for controlling external terminals and may be then able to request a remote control of the external terminals to the server.

Moreover, the mobile terminal 100 of watch-type according to the present invention may form a set with a mobile terminal, which is not a watch-type. A set of mobile terminals 100 may be able to construct a communication state capable of being connected with each other all the time between the mobile terminals via a short-range communication (e.g., Bluetooth). In this case, the mobile terminal 100 of watch-type can interact with the mobile terminal of the non-watch type paired with the terminal of watch-type. Hence, if an event occurs in the mobile terminal 100 of watch-type, the mobile terminal of non-watch type can produce an output corresponding to the event. On the contrary, if an event occurs in the mobile terminal of the non-watch type, the mobile terminal 100 of watch-type can produce an output corresponding to the event. As an example, if the mobile terminal of non-watch type gets a phone call, the mobile terminal 100 of watch-type can output feedback using a form of at least one selected from the group consisting of sound, vibration and wrist tightening to notify that the mobile terminal of non-watch type gets a phone call. Moreover, the mobile terminal 100 of watch-type and the mobile terminal of non-watch type can be configured to output simple information and complex information, respectively. In general, since a size of the display unit 151 of the mobile terminal 100 of watch-type is small, it is inappropriate to display complex information (i.e., data including a great amount of information to be displayed) on the display unit of the mobile terminal of watch-type. Hence, the mobile terminal 100 of watch-type according to the present invention can be configured to display simple information by itself and complex information (e.g., map data, data including a great amount of texts) can be configured to be outputted via the mobile terminal of non-watch type.

The mobile terminal 100 of watch-type according to the present invention can determine whether to produce an output in a mobile terminal of non-watch type based on information on whether a user is using the mobile terminal of non-watch type. As an example, if a face of the user is detected in an image which is inputted to a front camera 121 of the mobile terminal of non-watch type, it is determined as the user uses the mobile terminal of non-watch type. Hence, an output can be produced in the mobile terminal of non-watch type. Otherwise, an output may be produced in the mobile terminal 100 of the watch type.

In the following, concrete embodiments for the mobile terminal 100 of watch-type according to the present invention are explained in detail based on the aforementioned description.

Figure 6:
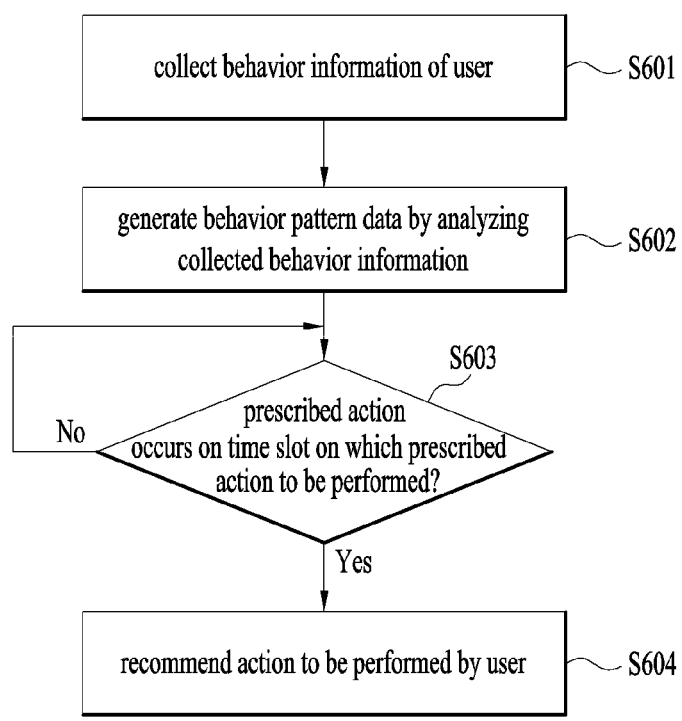
FIG. 6 is a flowchart for an operation of a mobile terminal according to one embodiment of the present invention.

FIG. 6 is a flowchart for an operation of a mobile terminal 100 according to one embodiment of the present invention. First of all, a mobile terminal 100 of watch-type collects behavior information of a user added to the mobile terminal 100 for a predetermined period [S601] and may be then able to generate behavior pattern data of the user according to a time slot by analyzing the collected data [S602]. In this case, the collected behavior information of the user can include at least one selected from the group consisting of position information of the mobile terminal 100, movement information of the mobile terminal 100 and audio information generated by the user. In this case, the movement information of the mobile terminal 100 can include at least one of information on a trajectory of the mobile terminal 100 and information on moving speed of the mobile terminal 100. The position information of the mobile terminal 100 can be obtained by the position-location module 115, the movement information of the mobile terminal can be obtained by the sensing unit 140 and the audio information of the mobile terminal 100 can be obtained by the microphone 122.

The controller 180 can generate behavior pattern data of the user by analyzing the collected behavior information of the user. In this case, the controller 180 respectively collects behavior information of the user on weekdays and behavior information of the user on weekends in consideration of a difference between a behavior pattern on weekdays and a behavior pattern on weekends. By doing so, the controller can generate behavior pattern data of the user on weekdays and behavior pattern data of the user on weekends, respectively. As a different example, the controller 180 can respectively generate behavior pattern data of the user on weekdays and behavior pattern data of the user on holidays in a manner of distinguishing weekdays from holidays. Yet, it is not mandatory to generate two data divided by weekends/weekdays or holidays/weekdays. It may be able to generate one of the two behavior pattern data only according to a configuration of a user.

The behavior pattern data of the user capable of being generated by the controller 180 can indicate a behavior of the user according to a time slot. Specifically, the behavior pattern data of the user can indicate rising hour of the user, meal time of the user, bedtime of the user, attendance time of the user and the like. Detail cases shall be described later.

The behavior pattern data of the user can be consistently updated by analyzing behavior information of the user collected day by day instead of being fixed. As an example, if the user wakes up at 8 o'clock on the first day and the user wakes up at 9 o'clock on the second day, a behavior pattern data of the user indicates that rising time of the user is 8 o'clock on the first day. On the contrary, the behavior pattern data of the user indicates that rising time of the user is 8:30 corresponding to an average value of accumulated information on the second day. As mentioned in the foregoing description, the behavior pattern data of the user can be consistently updated by the behavior data of the user collected day by day.

If a user arrives at a time slot on which a prescribed action is to be performed by the user, or if the user does not perform a prescribed action although time on which the prescribed action to be performed is passed away [S603], the controller 180 can recommend an action to be performed by the user based on behavior pattern data of the user [S604]. Specifically, the controller 180 can recommend an action to be performed by the user in a manner of outputting information on the action to be performed by the user on the display unit 151 or outputting feedback using at least one form selected from the group consisting of vibration, sound and wrist tightening.

In the following, the mobile terminal 100 according to the present invention is explained in more detail with reference to detail cases applicable to the mobile terminal 100 according to the present invention.

<Case 1—Outputting Alarm to Wake User Up>

A mobile terminal 100 according to the present invention collects and analyzes behavior information of a user and may be then able to generate wakeup time data of the user. Specifically, if the controller 180 detects movement of the user that wears the mobile terminal 100 for the first time in the morning hour, the controller 180 can determine time on which the movement of wearing the mobile terminal 100 occurs as the wakeup time of the user. Whether or not the user wears a mobile terminal 100 of watch-type can be determined based on a signal detected by a sensing unit 140 in the morning hour when the mobile terminal 100 moves more than a predetermined distance for the first time in the morning, when a band unit of the mobile terminal 100 is bent or combined with each other for the first time in the morning, when the mobile terminal detects a temperature of a user for the first time in the morning or the like. If it is determined as a user wakes up, the controller 180 generates wakeup time data of the user and can store the data in the memory 160. The controller 180 measures wakeup time of the user every day, accumulates the wakeup time and may be then able to update the wakeup time data using an average value of the measured wakeup time.

If the wakeup time data of the user is generated, the controller 180 can determine whether the user actually wakes up within predetermined time from wakeup time indicated by the wakeup time data of the user. If it is determined that the user does not wake up, although the predetermined time elapses from the wakeup time indicated by the wakeup time data, the controller 180 determines it as the user is sleeping late and may be able to control an alarm to be automatically outputted to wake the user up. In particular, if it is determined that the wakeup time of the user is later than usual, the controller 180 can control the alarm to be automatically outputted to wake the user up. In this case, the predetermined time can be automatically determined by the controller 180 or can be manually determined by the user. In this case, the predetermined time may correspond to time including 0. As an example, if the predetermined time corresponds to 0, the controller 180 may immediately output the alarm as soon as the wakeup time indicated by the wakeup time data elapses. If the predetermined time corresponds to 15 minutes, the controller 180 may be able to output the alarm after 15 minutes elapses from the wakeup time indicated by the wakeup time data.

If it is determined that the user gets up earlier than wakeup time indicated by the wakeup time data and a predetermined alarm exist between the wakeup time of the user and the wakeup time indicated by the wakeup time data, the controller 180 can control the automatically configured alarm to be cancelled. This is because, if the user gets up earlier than usual, it is not necessary to interrupt the user by outputting the alarm.

As mentioned in the foregoing description, the controller 180 can control the alarm to be cancelled or outputted based on whether the user gets up earlier than usual or whether the user is sleeping later than usual.

<Case 2—Displaying Information Required to be Checked by User in the Morning>

The present embodiment is explained in detail with reference to FIG. 7 in the following.

When a user gets up, the controller 180 can provide information required to be checked by the user in the morning to the user. Specifically, the controller 180 can output such information required to be checked by the user in the morning as weather information, a message or e-mail received in last night, traffic information around the user, headline news, today schedule of the user and the like. In this case, the news, the weather information, the traffic information and the like are received from an external server (e.g., a news server, a weather server, a traffic management server, or the like) via a wireless communication unit 110 and the schedule of the user may correspond to a schedule registered at the mobile terminal 100 in advance by the user.

Figure 7A:
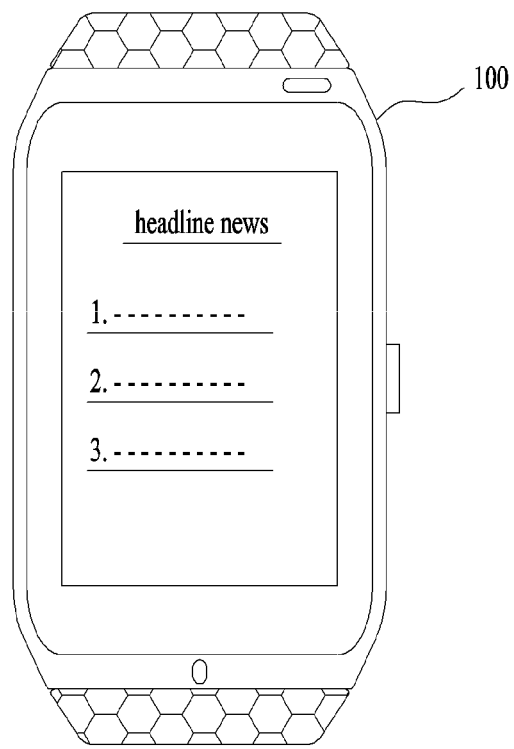
FIGS. 7a to 7c are diagrams for examples of providing predetermined information to a user when it is determined as the user gets up.
Figure 7B:
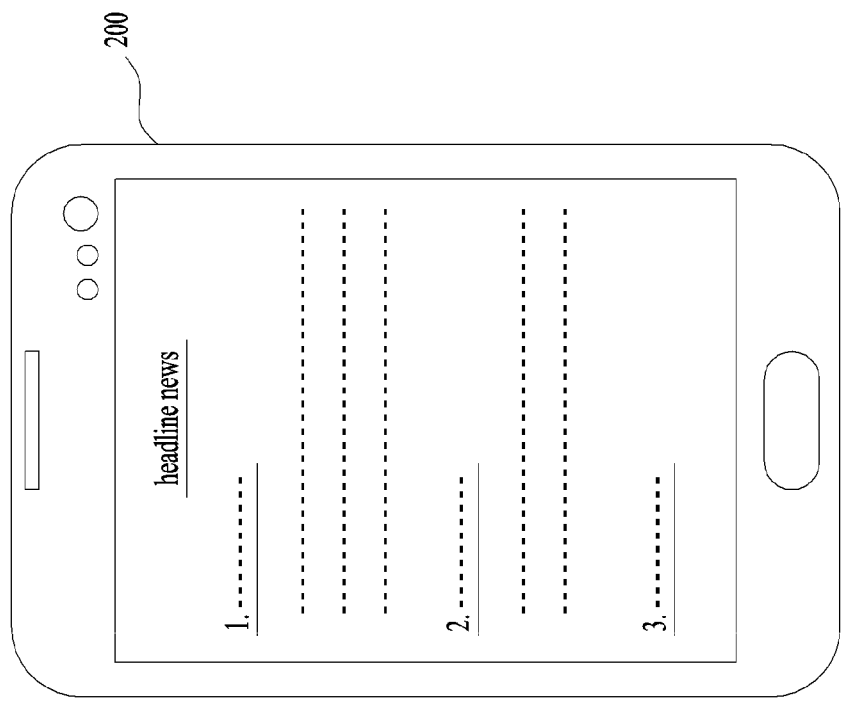
Figure 7B:
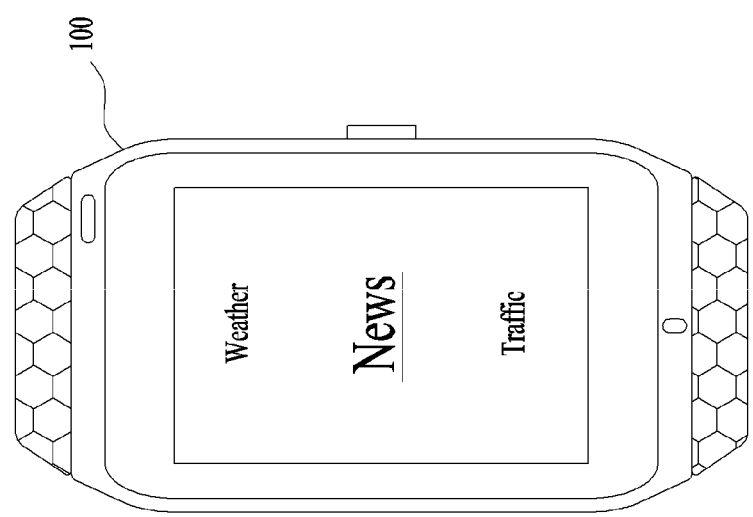
Figure 7C:
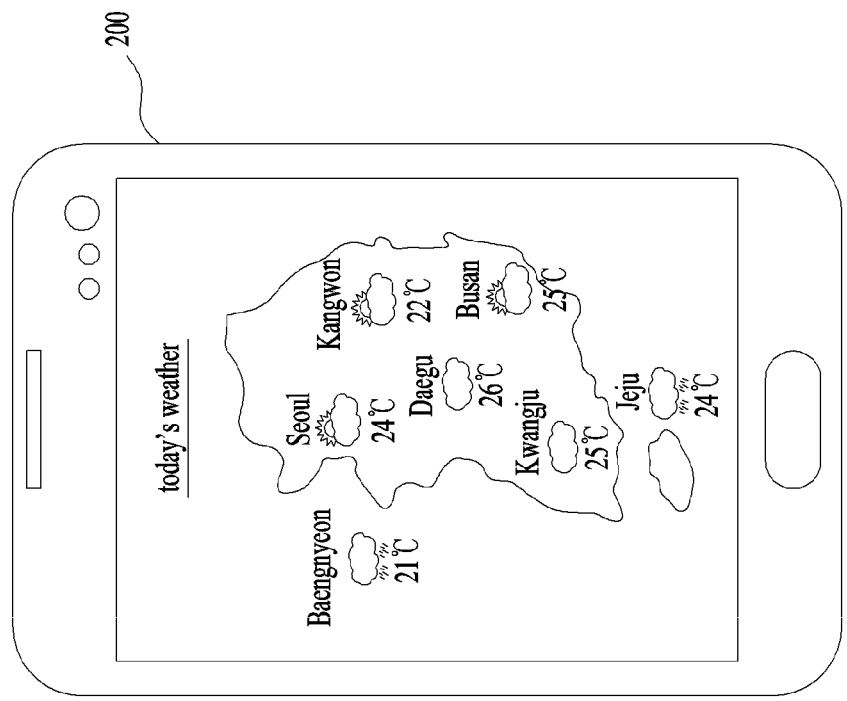
Figure 7C:
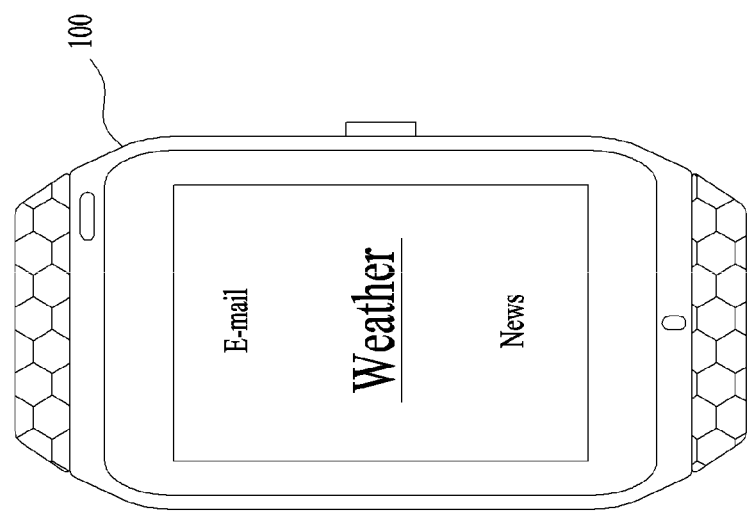

As shown in an example of FIG. 7a, the controller 180 can output information necessary for the user on the display unit 151 of the mobile terminal. As shown in an example of FIG. 7b, the controller 180 can control the information necessary for the user to be outputted on a mobile terminal 200 of non-watch type paired with the mobile terminal 100. As shown in the example of FIG. 7b, when the information necessary for the user is outputted on the mobile terminal 200 paired with the mobile terminal 100 of watch-type, a data type (e.g., weather, news, message, e-mail, traffic situation, schedule or the like) of the information outputted on the mobile terminal 200 of non-watch type can be outputted on the mobile terminal 100 of watch-type. Subsequently, if an input (e.g., a touch input touching the display unit 151 and flicking a pointer in a direction) intending to change the data type is received from the user, as shown in an example of FIG. 7c, the controller 180 can control information of a different data type to be outputted.

<Case 3—Remote Control>

When a user gets up, the controller 180 can remotely control such electronic goods as a TV, an audio and the like to be turned on based on a behavior pattern of the user. Specifically, if information on a behavior of a user repeatedly turning on a TV or an audio every morning is collected, the controller 180 can generate a behavior pattern data indicating that the user uses electronic goods when the user gets up in the morning. Hence, if it is determined that the user gets up, the controller can remotely control power of the TV, the audio and the like to be turned on to enable the user to immediately use the TV, the audio and the like. By doing so, the user can use the TV, the audio and the like without a separate operation.

Although an alarm is raised in the morning, if an action of a user wearing a watch is not detected, the mobile terminal 100 according to the present invention can control such electronic goods as a TV, an audio and the like to be automatically turned on. This is because, if it is determined that the user is not woke up although an alarm is raised, it is easier to make the user wake up by turning on the electronic goods such as the TV, the audio or the like. In this case, the controller 180 can control alarm sound, TV volume or audio volume to be gradually raised as time goes by.

<Case 4—Providing Recommendation Function to User Based on Speed of Wearing Watch of User>

A mobile terminal 100 according to the present invention collects behavior information of a user, analyzes the behavior information of the user and may be then able to generate data on time taken for wearing the mobile terminal 100 after the user wakes up. Specifically, if the controller 180 detects movement of the user wearing the mobile terminal 10 for the first time in the morning hours, the controller 180 can measure time taken from beginning of wearing the mobile terminal to end of wearing the mobile terminal 100. Whether the user starts to wear the mobile terminal 100 of watch-type can be determined based on a signal detected by a sensing unit 140 in the morning hour when the mobile terminal 100 moves more than a predetermined distance for the first time in the morning, when a band unit of the mobile terminal 100 is bent or combined with each other for the first time in the morning or the like. Whether the user finishes wearing the mobile terminal of watch-type can be determined based on a signal detected by a sensing unit 140 in the morning hour when a band unit is combined with each other, when the mobile terminal 100 detects a temperature of the user for the first time in the morning, or the like. The controller 180 measures time taken for wearing the mobile terminal of watch-type and may be then able to generate data on the time taken for wearing the mobile terminal 100 based on the time. The controller 180 measures time taken for wearing the mobile terminal 100 of watch-type every day, accumulates the time and may be then able to update the data on the time taken for wearing the mobile terminal using an average value of measured time.

When the data on the time taken for wearing the mobile terminal 100 is generated, the controller 180 measures time taken for wearing the mobile terminal 100 of the user and may be able to determine whether the user wears the mobile terminal 100 with speed of the usual speed. If the user wears the mobile terminal 100 of watch-type with speed slower than the usual speed, the controller 180 determines it as the user is in a relaxed situation and may be able to play music or remotely turn on electronic goods such as a TV, an audio, or the like.

On the contrary, if the user wears the mobile terminal 100 with speed faster than the usual speed, the controller 180 determines it as the user is in a hurry. Hence, the controller 180 can control information, which is necessary for the user to go out (e.g., weather information, traffic report information or the like), to be outputted on the mobile terminal.

<Case 5—Guiding Way to Work (or School)>

The present embodiment is explained in detail with reference to FIG. 8 in the following.

A mobile terminal 100 according to the present invention collects behavior information of a user, analyzes the behavior information of the user and may be then able to guide way to work (or school). As an example, the controller 180 may determine timing of going out for the first time in the morning on weekdays as attending work (or school) of the user. In this case, whether the user leaves the outdoors can be determined based on position information obtained by the position-location module 115.

Figure 8A:
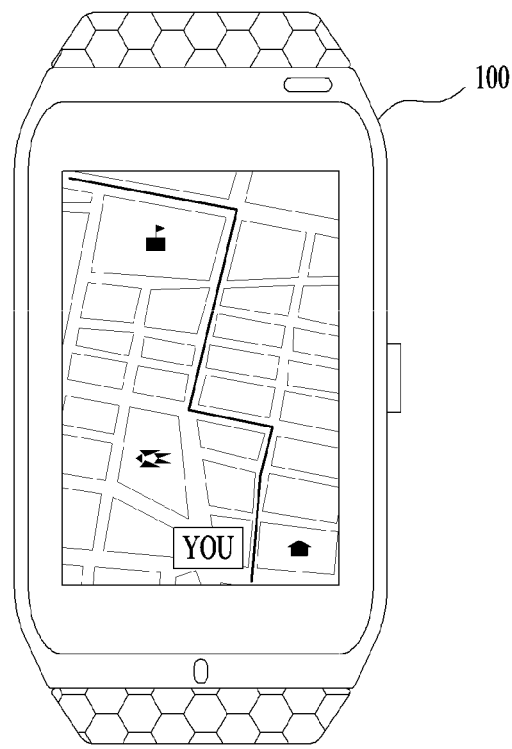
FIGS. 8a to 8c are diagrams for examples of providing path information to a destination to a user commuting to work or school.

If it is determined as the user goes to work (or school), as shown in FIG. 8a, the controller 180 can output a map data recommending a moving path to a place of duty (or school). In this case, the controller 180 can display at least one of a shortest distance path and a shortest time path on the map. The shortest time path can be calculated in consideration of a current traffic situation. In this case, in order to guide a path to the place of duty (or school) of the user, the mobile terminal 100 should have location information on the place of duty (or school) of the user in advance. The location information on the place of duty (or school) can be obtained based on an input of the user or can be automatically obtained based on a behavior pattern (e.g., a place to which the user consistently moves in the morning hours on weekdays) of the user.

Figure 8B:
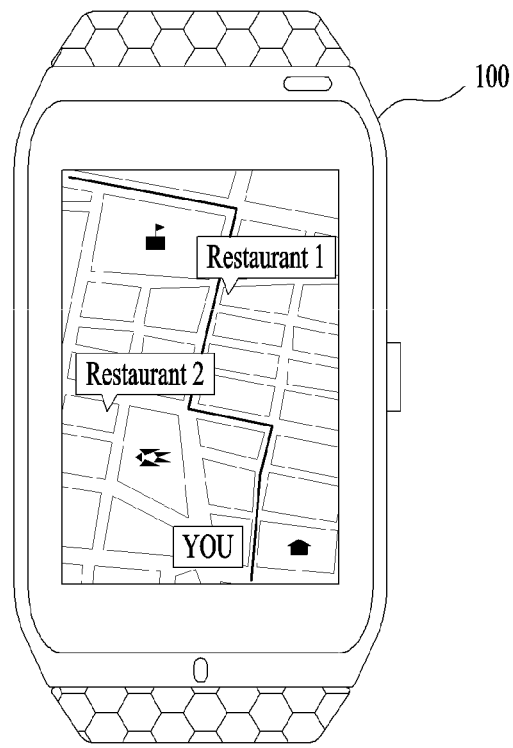
Figure 8C:
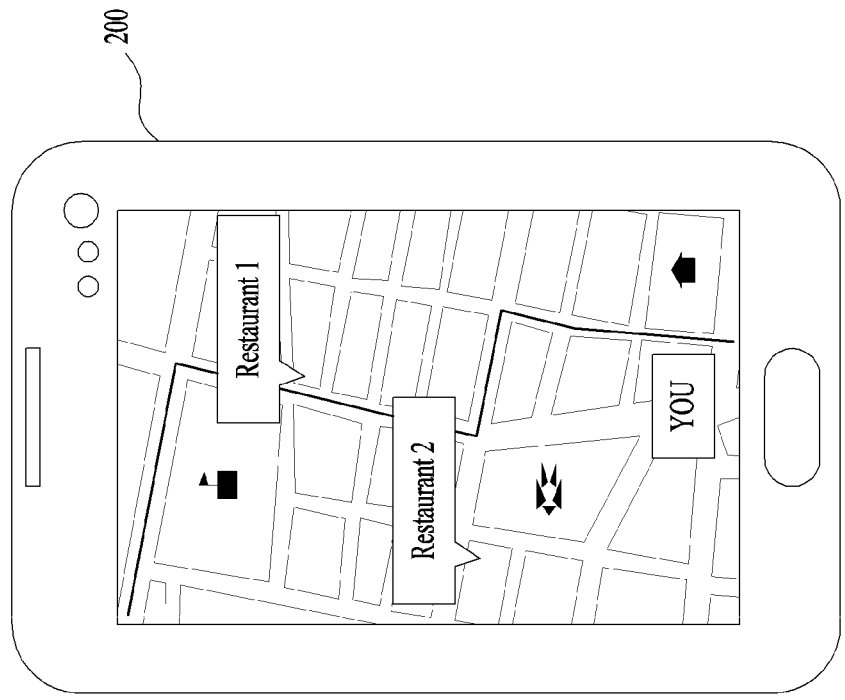
Figure 8C:
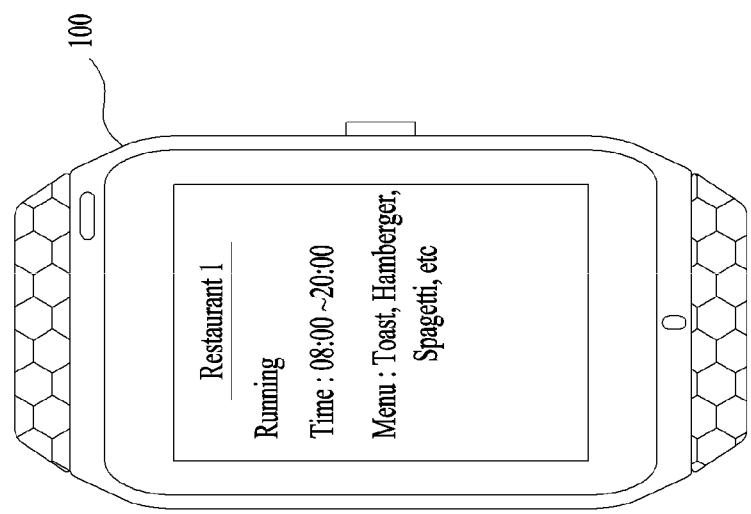

If it is determined as the user goes to work (or school) while skipping a meal, as shown in FIG. 8b, the controller 180 may display information on recommended restaurants on the mobile terminal. In this case, it may be preferable that the recommended restaurants are located on the way to the place of duty (or school). Since it may be difficult to display map information on the mobile terminal 100 of watch-type including a small screen, as shown in an example of FIG. 8c, the controller 180 can control information (e.g., name of recommended restaurant) on a recommended restaurant to be displayed on the mobile terminal 100 of watch-type and can control location information of the recommended restaurant to be outputted on a mobile terminal 200 of non-watch type, which is paired with the mobile terminal 100 of watch-type.

Whether the user skips a meal can be determined based on information on whether the mobile terminal 100 detects an action of having a meal before the user goes out. In order to have a meal, the user should bring food near mouth of the user. Hence, movement of repeatedly moving arms up and down may occur. In particular, if the sensing unit 140 detects movement of the mobile terminal 100 repeatedly moving up and down more than a prescribed number, the controller 180 may be able to determine it as the user had a meal. In addition to a signal detected by the sensing unit 140, the controller 180 may also be able to determine whether the user has a meal in consideration of whether sound of eating food of the user is inputted to the microphone 122.

In recommending a restaurant, the controller 180 can select a recommended restaurant selling food appropriate for a current body condition of a user in consideration of a body condition of the user. As an example, if the user has a drink last night, the controller may recommend a restaurant selling food good for a hangover. If it is determined as the user approaches a recommended restaurant, as shown in an example of FIG. 8d, the controller 180 outputs a guide screen indicating that the user is positioned in the vicinity of the recommended restaurant. In addition to the guide screen, the controller can control feedback of at least one selected from the group consisting of audio, vibration and wrist tightening to be outputted.

Although the user is on the way to work (or school) without having a meal, if it is anticipated that the user is unable to arrive at work (or school) on time, a process of recommending a restaurant can be omitted. In particular, the controller 180 can recommend a restaurant to the user only when the user is able to arrive at the place of duty (or school) on time. In order to determine whether the user is able to arrive at the place of duty (or school) on time, information on attendance time of the user should be stored in the controller in advance. The information on the attendance time of the user can be inputted by the user in advance or can be automatically obtained based on a behavior pattern (e.g., average time of arriving at the place of duty (or school)) of the user.

<Case 6—Induction to Balanced Diet>

The present embodiment is explained in detail with reference to FIG. 9 in the following.

The mobile terminal 100 according to the present invention 100 collects information on food taken by a user, an intake pattern of the user and the like while the user having a meal and may be then able to induce the user to have a balanced diet.

As an example, if it is determined as a user has a meal, the controller 180 activates a camera 121, analyzes image data inputted to the camera 121 and may be then able to determine food that the user has taken. Subsequently, the controller 180 calculates calories of the food and may be then able to control the calorie information of the food to be displayed on the mobile terminal as shown in an example of FIG. 9a (referring to the example of FIG. 9a, calorie information of the food is displayed in a calorie unit).

Figure 9A:
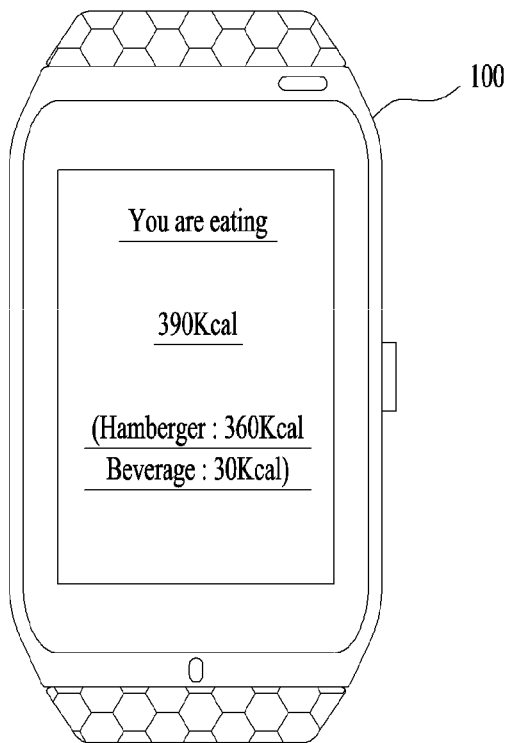
FIGS. 9a to 9d are diagrams for examples of providing prescribed information to a user at table.
Figure 9B:
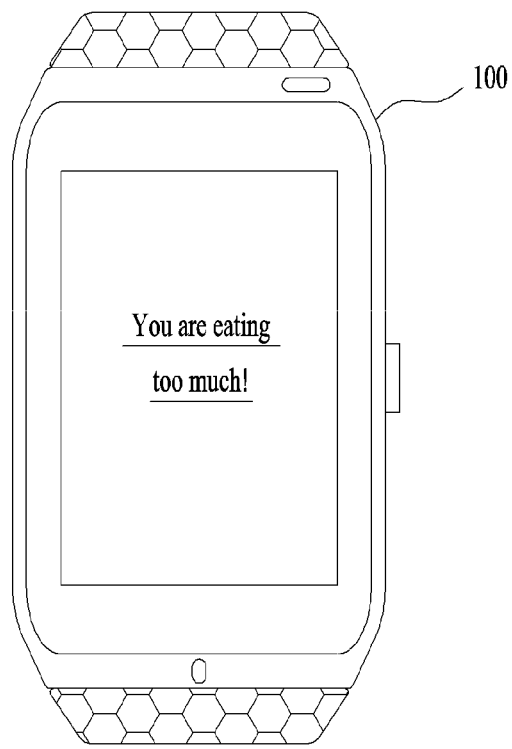
Figure 9C:
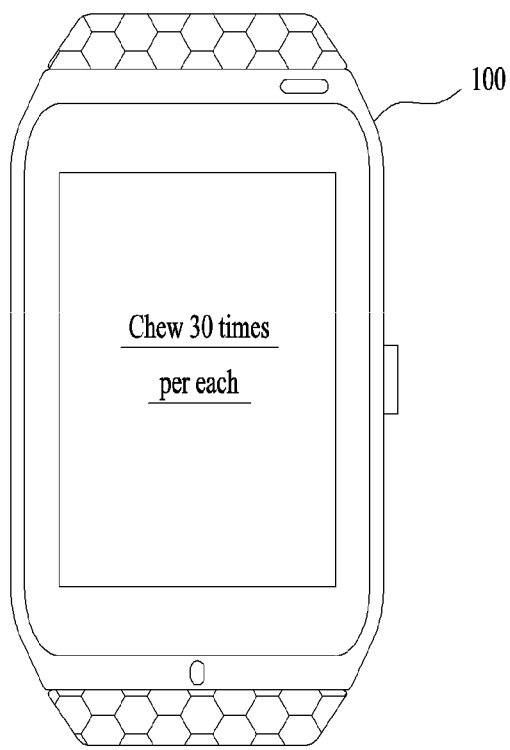
Figure 9D:
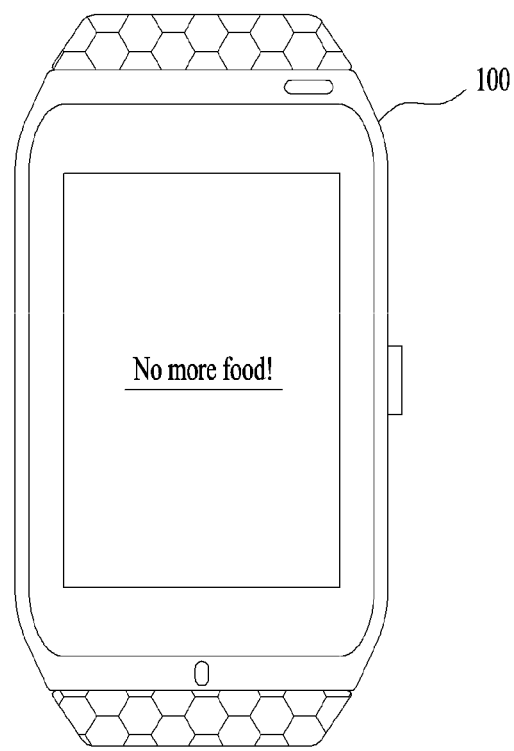

In this case, if the calorie of the food of the user is higher than a recommended calorie corresponding to a standard body weight (or weight) of the user, as shown in an example of FIG. 9b, the controller 180 outputs a warning screen warning that the calorie of the food of the user is high. In addition to the warning screen, the controller can control feedback of at least one selected from the group consisting of audio, vibration and wrist tightening to be outputted. In this case, a factor (or weight) for calculating the standard body weight of the user can be inputted in advance by the user.

In order to have a meal, a user should repeatedly move arms up and down. The controller 180 can measure eating speed of the user in a manner of measuring the number of movements of the mobile terminal 100 repeatedly moving up and down. Specifically, the controller 180 collects behavior information of the user, analyzes the behavior information of the user and may be then able to generate data on the eating speed of the user. Subsequently, if it is determined as the user is eating faster than the usual speed of eating, as shown in an example of FIG. 9c, the controller 180 can control a guide screen asking the user to eat slowly to be outputted on the mobile terminal. In addition to the guide screen, the controller can control feedback of at least one selected from the group consisting of audio, vibration and wrist tightening to be outputted. As mentioned in the foregoing description, if the controller asks the user to eat slowly, it may be able to prevent the user from eating food too fast.

If the number of meals of a user is too many, the mobile terminal 100 according to the present invention may warn the user that the number of meals is too many. As an example, if the number of meals of the user exceeds a predetermined number, as shown in an example of FIG. 9d, the controller 180 can control a warning screen warning against too many meals to be outputted on the mobile terminal. In addition to the warning screen, the controller can control feedback of at least one selected from the group consisting of audio, vibration and wrist tightening to be outputted. As mentioned in the foregoing description, if the controller warns against too many meals of the user, the controller may arose the user's attention and may be then able to induce the user to have an appropriate amount of food.

<Case 7—Recommending Restaurant to User at Meal Time>

Figure 10A:
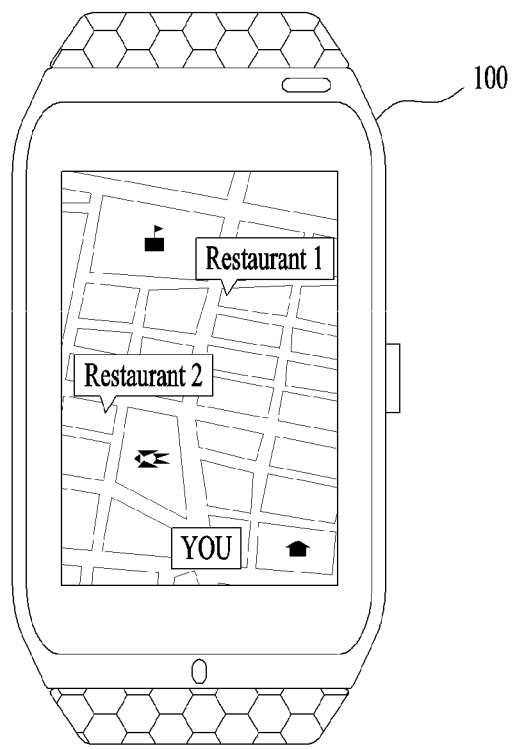
FIGS. 10a and 10b are diagrams for examples of outputting information on a recommended restaurant.
Figure 10B:
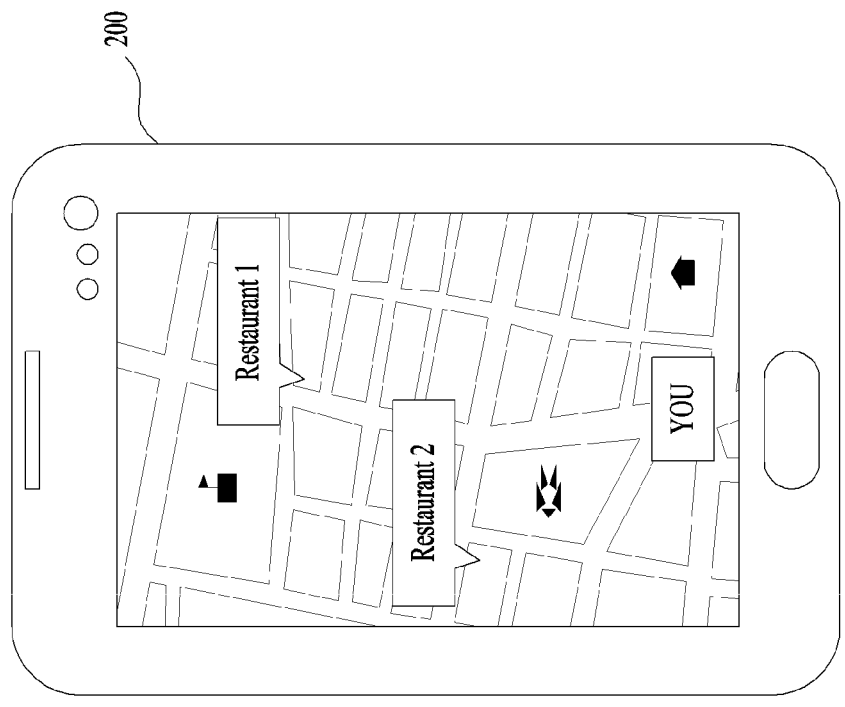
Figure 10B:
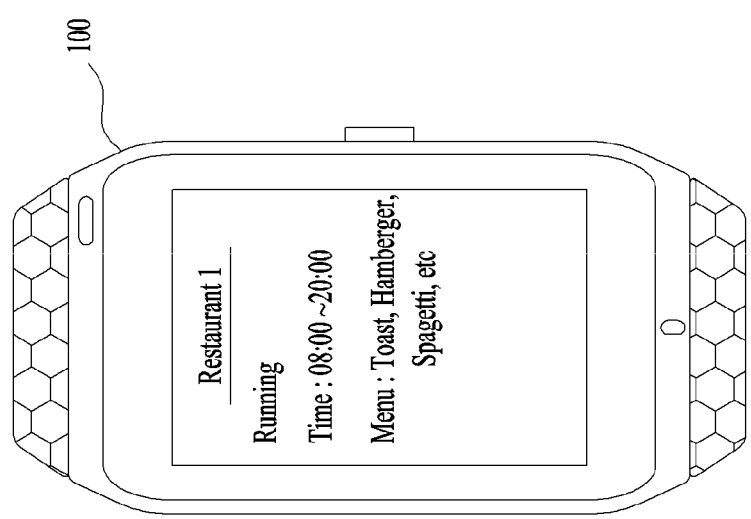

The present embodiment is explained in detail with reference to FIG. 10 in the following.

If a user does not have a meal despite it is time for meal or a prescribed time is passed away from a usual meal time of the user, the controller 180 may inform the user of a recommended restaurant. As an example, as shown in an example of FIG. 10a, the controller may display information on the recommended restaurant on a map. In addition to the information on the recommended restaurant displayed on the map, the controller can control feedback of at least one selected from the group consisting of audio, vibration and wrist tightening to be outputted to inform the user of the meal time. As mentioned earlier in FIG. 8b and FIG. 8c, since it may be difficult to display map information on the mobile terminal of watch-type including a small screen, as shown in an example of FIG. 10b, the controller 180 may display the information on the recommended restaurant on the mobile terminal 100 of watch-type and may be able to control location information of the recommended restaurant to be outputted on a mobile terminal 220 of non-watch type, which is paired with the mobile terminal of watch-type.

In this case, data on the usual meal time of the user can be automatically generated by collecting behavior information of the user and analyzing the behavior information of the user. Or, the data can be manually generated by an input of the user.

In recommending a restaurant, the controller 180 may be able to recommend a restaurant selling food different from food previously taken by the user in consideration of the food previously taken by the user (e.g., if the user eats noodle for lunch, the controller recommends different type of food rather than noodle for dinner). When the user has a meal, the controller 180 analyzes an image data inputted to the camera 121 and may be then able to store information on food taken by the user. Or, the controller 180 can manually obtain the information on the food taken by the user via a user input.

When a restaurant is recommended, the controller 180 can preferentially recommend a restaurant positioned near a current position based on information on the current position obtained by the position-location module 115.

<Case 8—Informing User of Regular Medicine Taking>

Figure 11A:
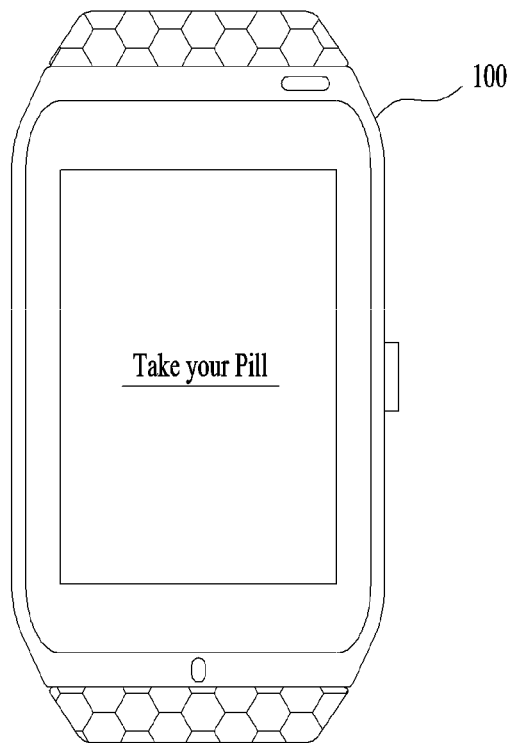
FIGS. 11a and 11b are diagrams for examples of outputting a guide screen guiding a user to take medicine.
Figure 11B:
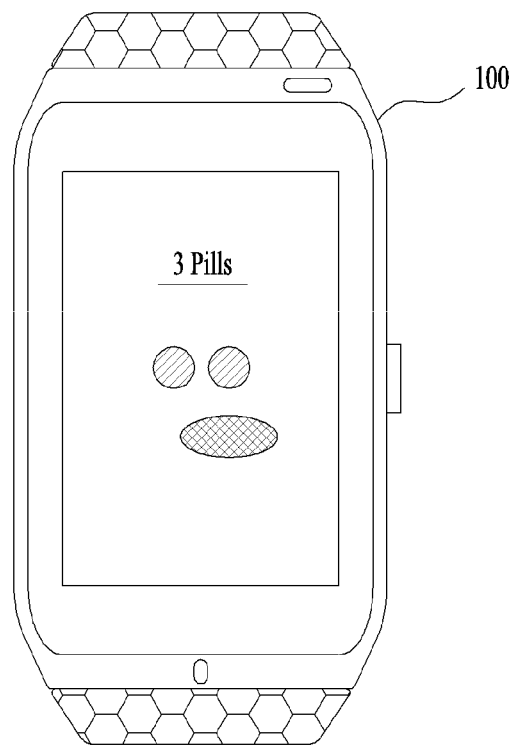
Figure 12A:
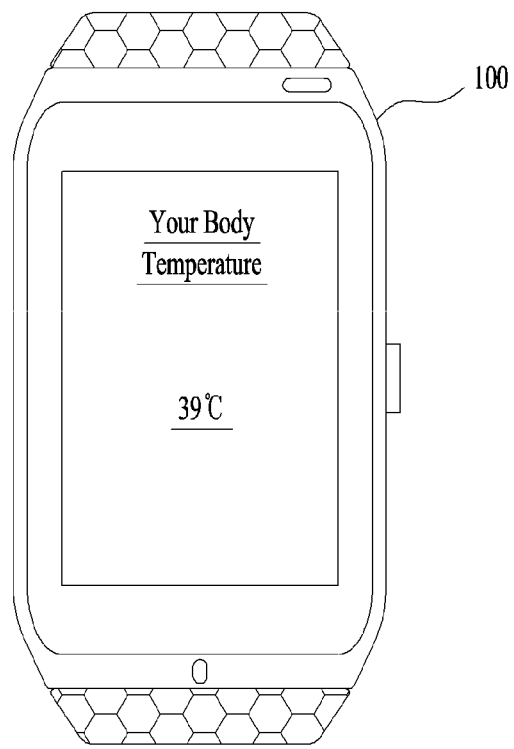
FIGS. 12a to 12c are diagrams for examples of displaying prescribed information for a sick user.
Figure 12B:
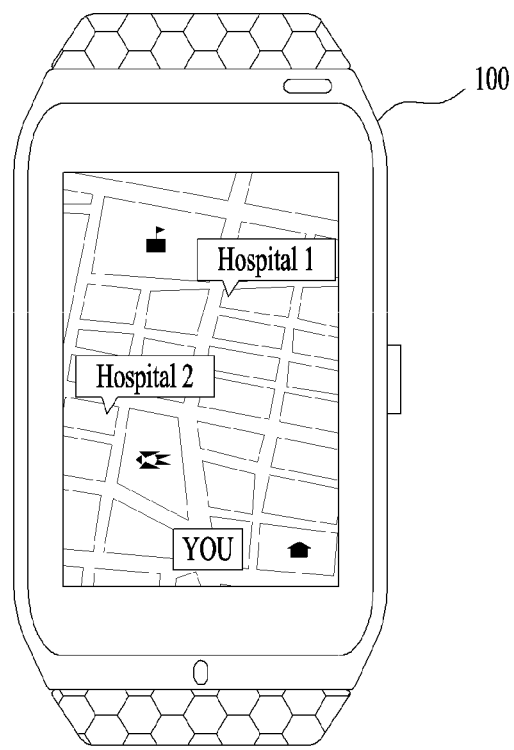
Figure 12C:
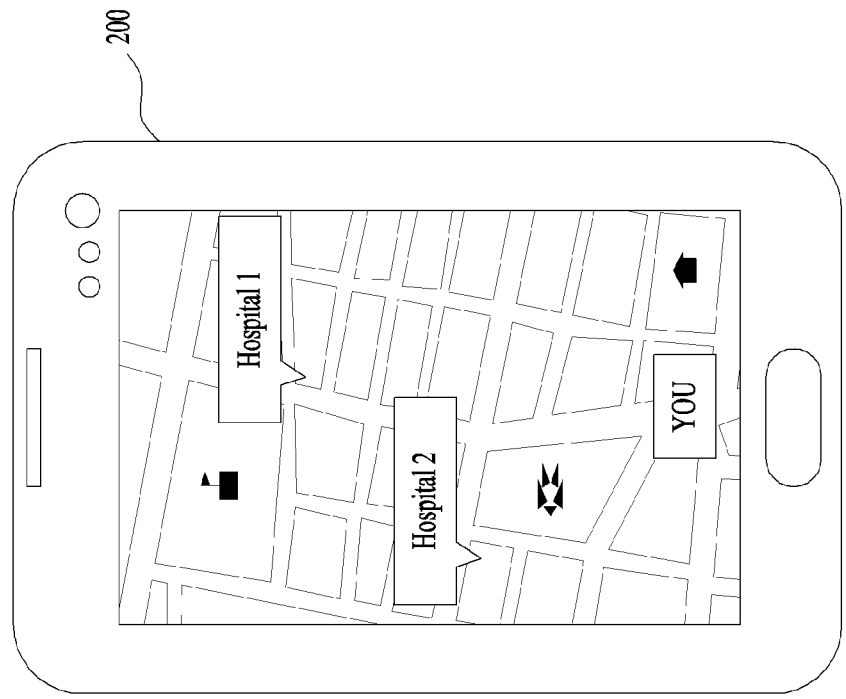
Figure 12C:
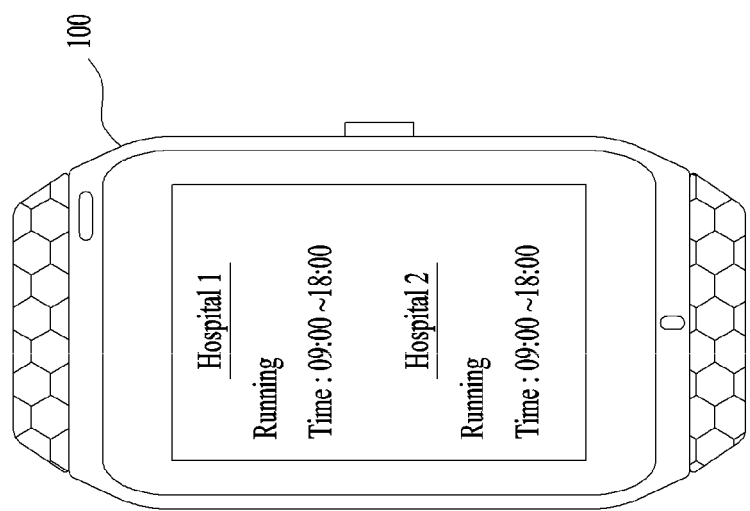

The present embodiment is explained in detail with reference to FIG. 11 in the following.

A person suffering from chronic illness should regularly take medicine. Hence, for those who should regularly take medicine consistently, a mobile terminal 100 according to the present invention can help a user to take a medicine when time of taking a medicine is come.

Data on time of regularly taking medicine can be manually generated by an input of a user or can be automatically generated by collecting behavior information of a user and analyzing the behavior information of the user. As an example, in case of taking a medicine, since an action of taking the medicine and an action of drinking water of a user are contiguously occur, if the action of taking the medicine and the action of drinking water repeatedly occurring in a prescribed time slot are detected based on a detection signal of a sensing unit 140, the controller 180 can recognized that the user corresponds to a patient who should regularly take medicine. Specifically, in order to take medicine, the user should move arms up and down to bring the medicine near mouth of the user. And, in order to drink water, the user should move arms up and down to hold a cup by a hand and bring the cup near the mouth of the user. Hence, if actions of the user are detected in a following order i) movement of arms moving up and down (taking medicine), ii) movement of muscle holding an object (holding a water cup) and iii) movement of arms moving up and down while holding an object (drinking water), the controller 180 can determine it as the user has performed an action of taking medicine.

If the user does not take medicine despite it is time to take medicine or a prescribed time is passed away from usual time of taking medicine, the controller 180 can advise the user to take medicine. As an example, as shown in an example of FIG. 11a, the controller 180 can display a guide screen informing the user of time of taking medicine. In addition to the guide screen, the controller 180 can control feedback of at least one selected from the group consisting of audio, vibration and wrist tightening to be outputted.

As mentioned in the foregoing description, if the controller advises the user to regularly take medicine, the user, who should regularly take medicine, can consistently take medicine without missing the time of taking medicine.

When the controller advises the user to take medicine, the controller 180 can also display information on the number of medicine, which should be taken by the user. The information on the number of medicine can be obtained by analyzing an image data inputted to the camera 121 when the user usually takes medicine. In particular, if it is determined as the user takes medicine, the controller 180 activates the camera 121, analyzes the image data of which the medicine is captured and may be then able to obtain the information on the number of medicine, which should be taken by the user. As an example, as shown in an example of FIG. 11*b*, the controller 180 can control the information on the number of medicine to be displayed on the mobile terminal.

<Case 9—when Health Condition of User is Deteriorated>

The present embodiment is explained in detail with reference to FIG. 12 in the following.

If it is determined as a user is sick or has a health problem, a mobile terminal 100 according to the present invention may be able to warn the user that the user has a problem in health. Specifically, if cough of the user is repeatedly detected by the microphone 122, as shown in an example of FIG. 12*a*, the controller 180 can start to measure a temperature of the user. If the temperature of the user is higher than a normal temperature, the controller 180 determines it as the user has caught a cold and may be able to control a guide screen recommending a neighboring hospital to the user to be displayed on the mobile terminal. Since it may be difficult to display map information on the mobile terminal 100 of watch-type including a small screen, as shown in an example of FIG. 12*c*, the controller 180 may display information (e.g., name of hospital) on a recommended hospital on the mobile terminal 100 of watch-type and may be able to control location information of the recommended hospital to be outputted on a mobile terminal 200 of non-watch type, which is paired with the mobile terminal 100 of watch-type.

Moreover, the controller 180 may be able to remotely control such a home appliance as an air cleaner, a cleaner (e.g., a robot cleaner), a heater, an air conditioner and the like to work to develop clean indoor environment and maintain ideal temperature.

If a hand of a user is trembling due to a chill or movement of the user is less than usual, the controller 180 starts to measure a temperature of the user. As shown in an example of FIG. 12*a*, the controller 180 can output a measurement result. If the temperature of the user is higher than a normal temperature, as shown in an example of FIG. 12*b* or FIG. 12*c*, the controller determines it as the user is sick and may be then able to display a guide screen recommending a neighboring hospital to the user. In addition, the controller 180 can control such a home appliance as an air cleaner, a cleaner (e.g., a robot cleaner), a heater, an air conditioner and the like to automatically work to develop clean indoor environment and maintain ideal temperature. If the user is trembling due to a chill, the mobile terminal 100 also moves according to the trembling of the user. In particular, the controller 180 can determine whether the user is trembling based on the movement of the mobile terminal 100.

In the aforementioned embodiments, although the temperature of the user is measured when the cough of the user or the trembling of the user is detected, it is not mandatory to measure the temperature of the user only after the aforementioned situations occur. The temperature of the user can be measured by the sensing unit 140 before the cough of the user or the trembling of the user is detected.

Moreover, although the cough of the user or the trembling of the user is not detected yet, if the temperature of the user is higher than a normal temperature, the controller 180 can determine it as the user is sick. In this case, as mentioned in the foregoing description, the controller may be able to display a guide screen recommending a neighboring hospital to the user or execute an operation of remotely controlling a home appliance.

According to the example of the aforementioned embodiment, the temperature of the user is measured by the sensing unit 140. In addition to the sensing unit, the mobile terminal 100 according to the present invention can more precisely determine whether the user has a health problem using at least one selected from the group consisting of a sensor device configured to measure a blood pressure of the user, a sensor device configured to measure a heartbeat of the user and a sensor device configured to measure total body fluid of the user. As an example, the controller 180 can also provide information on whether the user is affected by edema and information on a level of body water of the user to the user using the sensor device configured to measure total body fluid of the user.

If contact information (e.g., telephone number, e-mail, messenger ID or the like) of a family doctor of a user is registered at the mobile terminal 100, the controller 180 can be configured to automatically report a health condition of the user to the family doctor in a form of a message or e-mail when it is determined as a problem occurs in health of the user.

<Case 10—when User Enters Sleeping State>

Figure 13A:
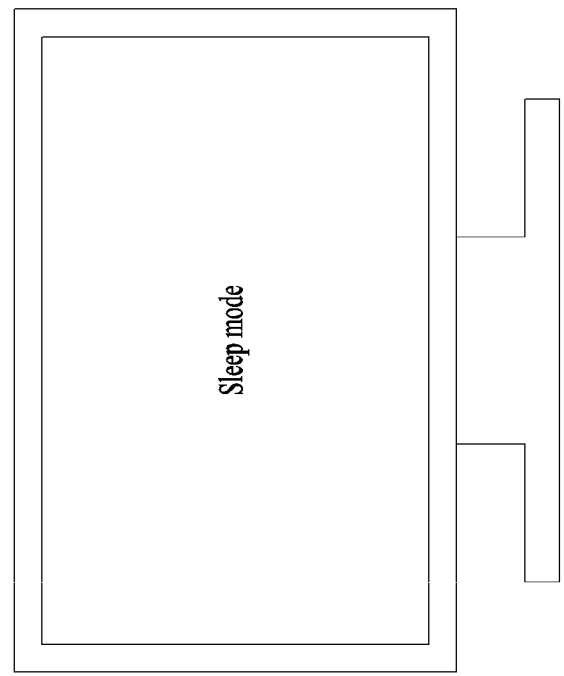
FIGS. 13a and 13b are diagrams for examples of an operation of a mobile terminal when a user falls asleep.
Figure 13A:
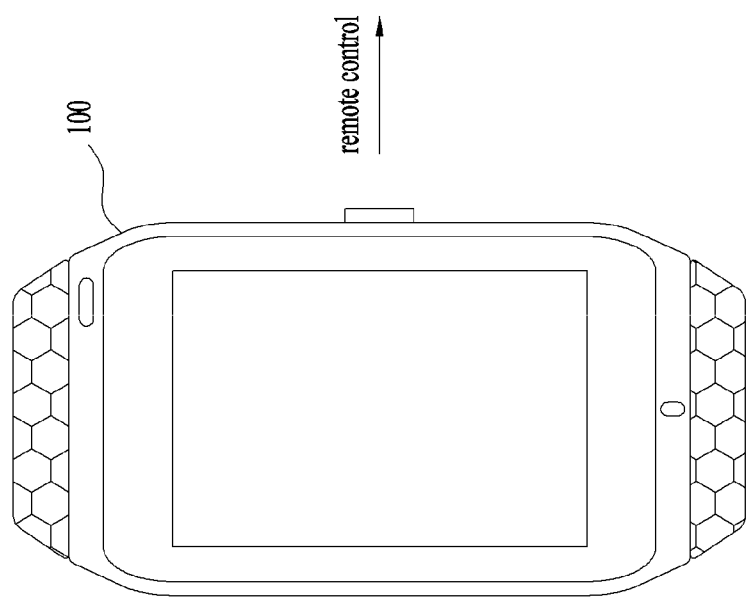
Figure 13B:
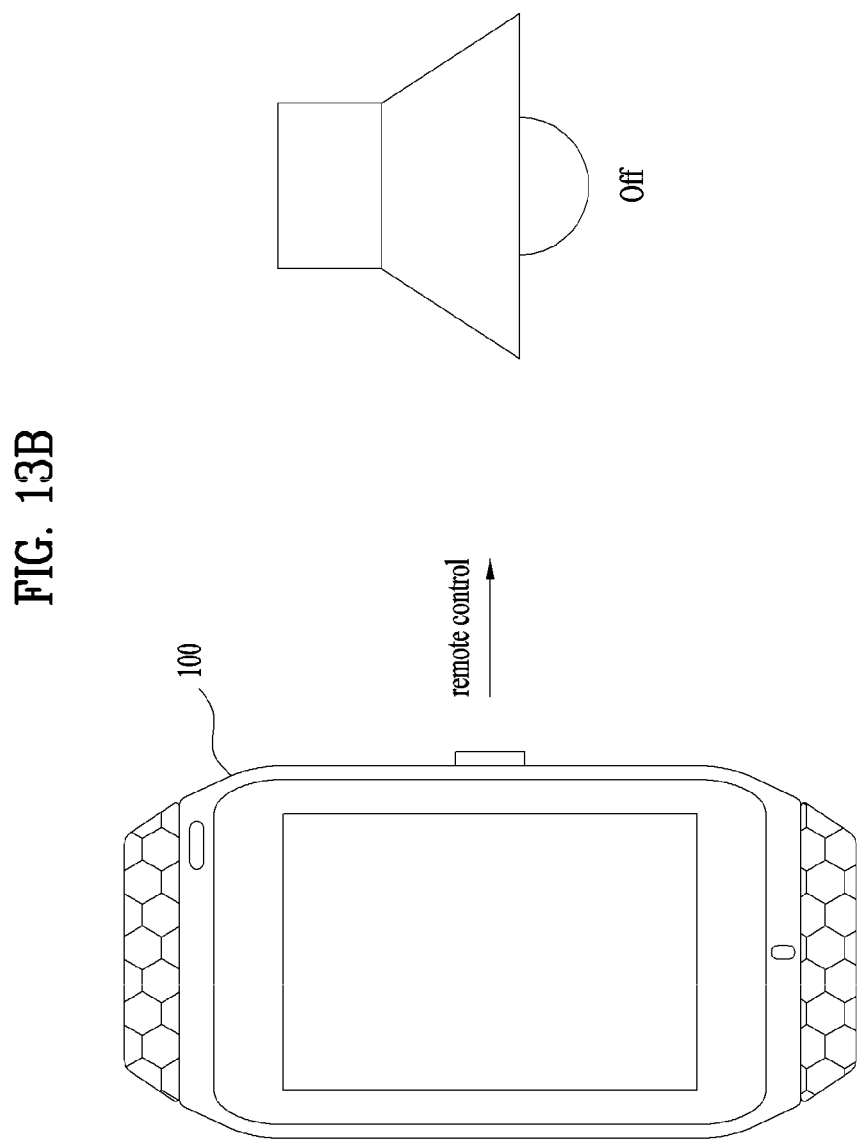

The present embodiment is explained in detail with reference to FIG. 13 in the following.

If it is determined as a user is sleeping while wearing a mobile terminal 100, the mobile terminal 100 according to the present invention can control electronic device around the user, lighting and the like to be automatically turned off (or sleeping mode). As an example, if it is determined as a user is dropping off in the middle of working with a computer, as shown in an example of FIG. 13*a*, the controller 180 can control the computer to enter a sleeping mode (or power off). Moreover, if it is determined as the user is sleeping while wearing the mobile terminal 100, as shown in an example of FIG. 13*b*, the controller 180 can control lighting around the user to be automatically turned off.

When the user falls asleep, movement of the user does not occur for a long time. Hence, if movement of the user does not occur for prescribed time, in particular, if the mobile terminal 100 does not move for prescribed time, the controller 180 can determine it as the user is in a sleeping state.

If it is determined as the user went to work while an electronic device or lighting is turned on, the controller 180 can control the electronic device or the lighting to be automatically turned off.

<Case 11—when User Concentrates on Work>

The present embodiment is explained in detail with reference to FIG. 14 in the following.

Figure 14A:
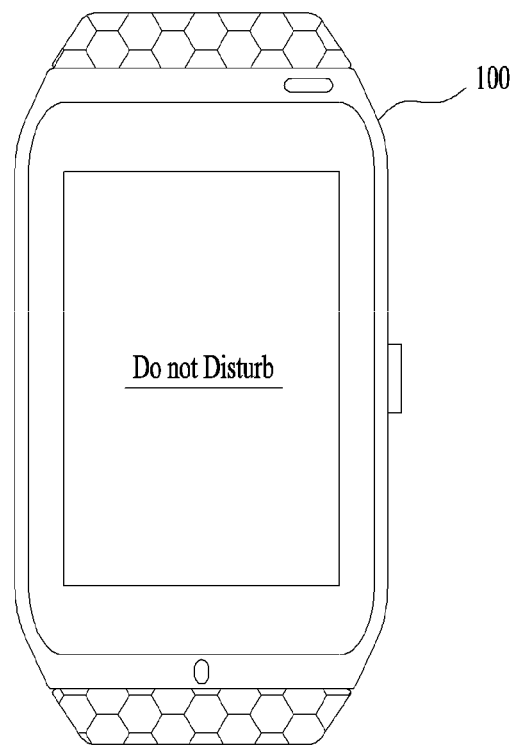
FIGS. 14a to 14c are diagrams for examples of a Do Not Disturb mode of a mobile terminal.
Figure 14B:
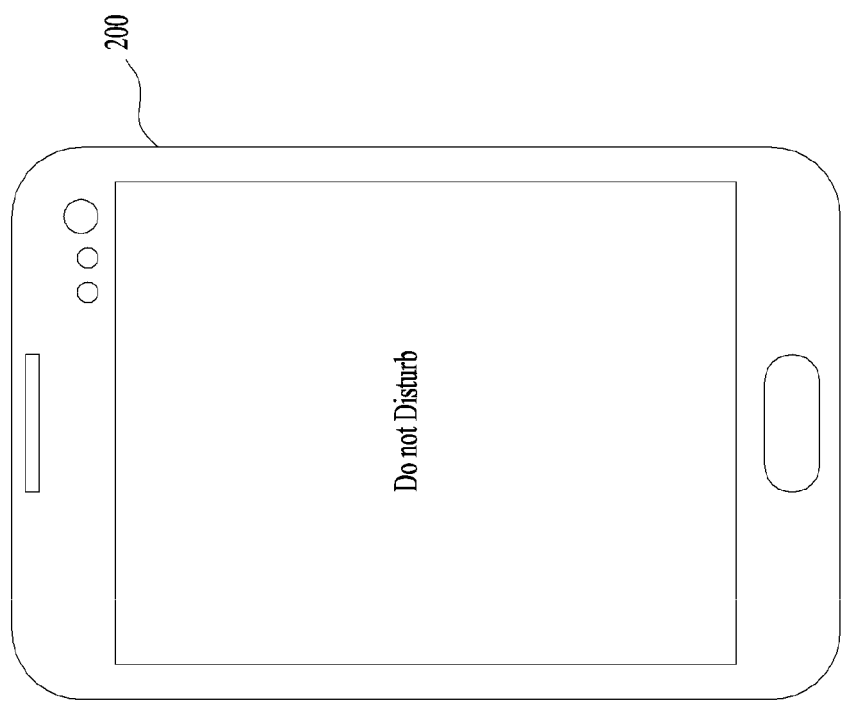
Figure 14B:
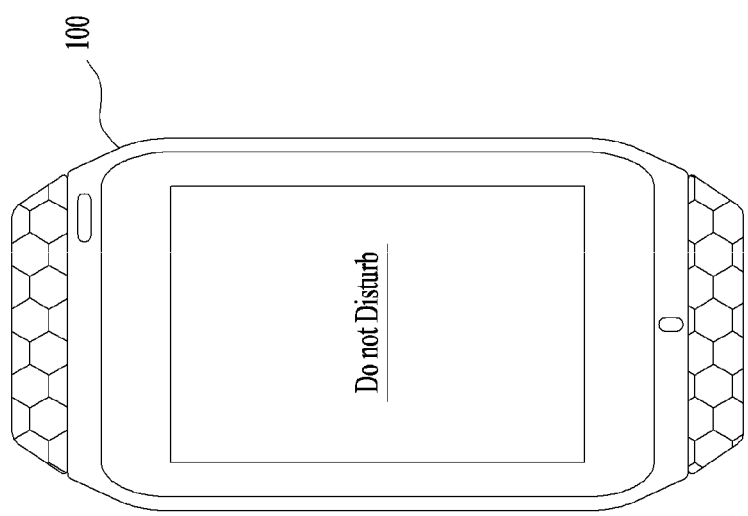
Figure 14C:
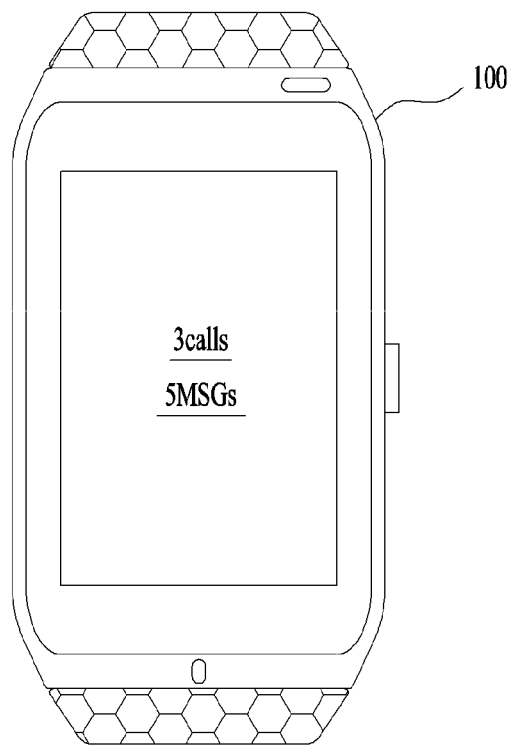

If it is determined as a user is concentrating on work, as shown in an example of FIG. 14*a*, the controller 180 can be automatically configured by a Do Not Disturb mode. Specifically, if it is determined as the user is typing on a keyboard, the user is rapidly typing on a keyboard or the like, the controller 180 can determine it as the user is concentrating on work. As shown in an example of FIG. 14*b*, if the mobile terminal 100 of watch-type is configured by the Do Not Disturb mode, a mobile terminal 200 of non-watch type paired with the mobile terminal of watch-type can be configured by the Do Not Disturb mode as well. In this case, the controller 180 can determine whether the user is typing on a keyboard based on at least one of a signal detected by a sensing unit 140 detecting movement of muscle, which moves according to movement of fingers of the user, and sound occurring when the user types on a keyboard.

If the mobile terminal is configured by the Do Not Disturb mode, the controller 180 can omit to output alarm for occurrence of an event such as message reception, telephone call and the like. By doing so, work concentration of the user may increase. Yet, if there is a schedule registered by the user in advance, although the mobile terminal 100 is configured by the Do Not Disturb mode, the controller can control feedback to be outputted to inform the user of the schedule registered by the user on start time of the schedule registered by the user or before the schedule is started. As shown in an example of FIG. 14b, the controller 180 can control a guide screen guiding remaining time to the schedule registered by the user to be displayed on the mobile terminal.

If the user temporarily stops working or an appropriate touch input is inputted on the display unit 151, the controller 180 can cancel the Do Not Disturb mode. As shown in an example of FIG. 14c, if the Do Not Disturb mode is cancelled, the controller 180 can control the number of events (e.g., message or telephone call), which have occurred while the mobile terminal is configured by the Do Not Disturb mode, or a list of the occurred events to be displayed on the mobile terminal. In this case, a touch input for cancelling the Do Not Disturb mode may have various forms including a touch of the display unit 151 more than a prescribed number using a pointer, moving the pointer in a direction while touching the display unit 151, and the like.

<Case 12—Warning Excessive Drinking>

The present embodiment is explained in detail with reference to FIG. 15 in the following.

Figure 15A:
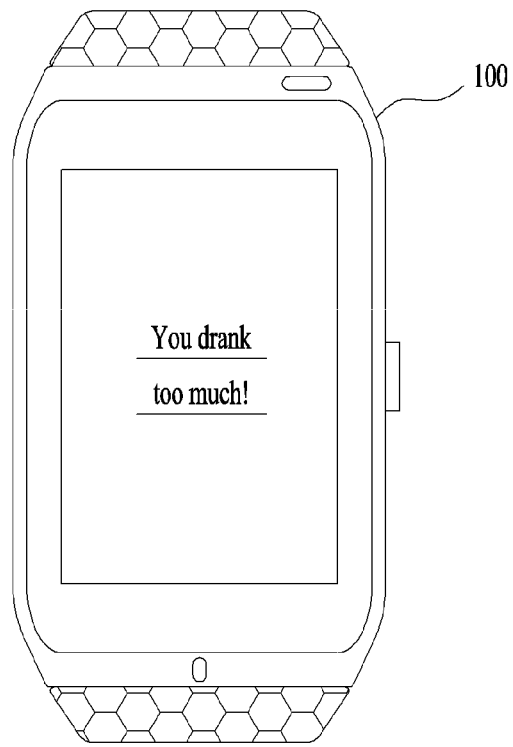
FIGS. 15a and 15b are diagrams for examples of providing prescribed information to a user in drinking.

If it is determined as a user is excessively drinking, as shown in an example of FIG. 15a, the controller 180 outputs a warning screen warning excessive drinking and may be able to control feedback of at least one selected from the group consisting of audio, vibration and wrist tightening to be outputted. If an action (e.g., i) movement of a muscle holding an object (holding a cup), ii) moving arms up and down while holding the object (drinking)) of drinking at night-time is repeatedly detected, the controller 180 can determine it as the user is in a state of drinking. The controller 180 can determine whether the user excessively drinks based on at least one drinking time of the user and an amount of drinking (i.e., the number of moving arms up and down).

Figure 15B:
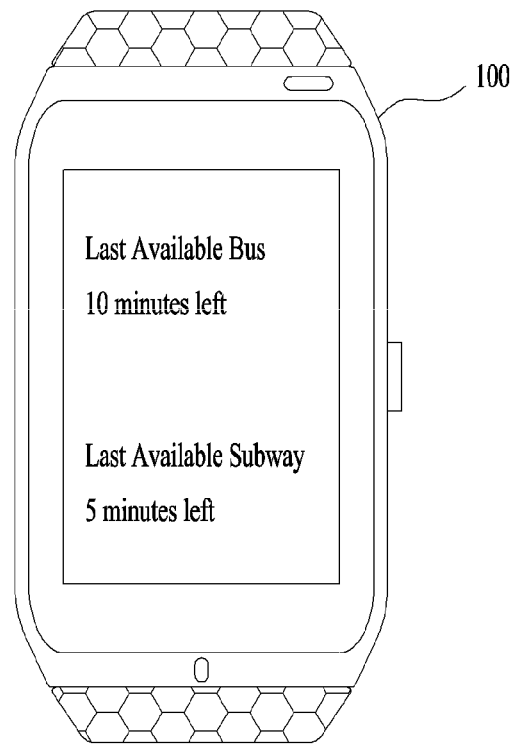

If the user drinks despite it is almost time on which a last public transportation heading to home arrives at a near station, as shown in an example of FIG. 15b, the controller 180 can display a guide screen guiding the user that there is not much time left available for public transportation. In addition to the guide screen, the controller can control feedback of at least one selected from the group consisting of audio, vibration and wrist tightening to be outputted. At least one of the remaining time available for the last public transportation and information on an available public transportation can be included in the guide screen.

<Case 13—Advising User to Drink Water>

Figure 16A:
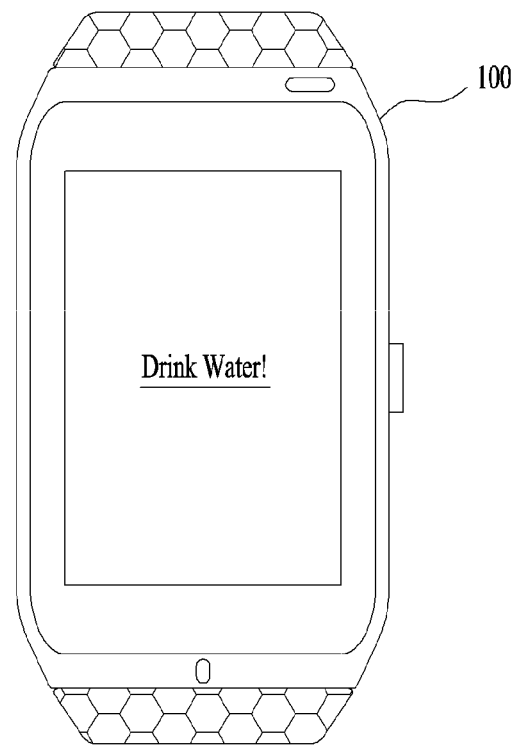
FIGS. 16a and 16b are diagrams for examples of outputting a guide screen to recommend a user to drink water.

The present embodiment is explained in detail with reference to FIG. 16 in the following.

In order to stay healthy, the right amount of water should be maintained in a body. Hence, if it is determined as a user does not drink water for a long time, the mobile terminal 100 according to the present invention can advise the user to drink water. Specifically, as shown in an example of FIG. 16a, the controller 180 outputs a guide screen advising the user to drink water and may be able to control feedback of at least one selected from the group consisting of audio, vibration and wrist tightening to be outputted.

In order for the user to drink water, an action of holding a cup and bringing the cup to mouth of the user should be performed. If the sensing unit 140 detects movement of holding the cup and movement of brining the cup to the mouth, the controller 180 can determine it as the user has drunk water. As a different example, the controller 180 may determine total body fluid of the user using a sensor device measuring the total body fluid of the user.

Figure 16B:
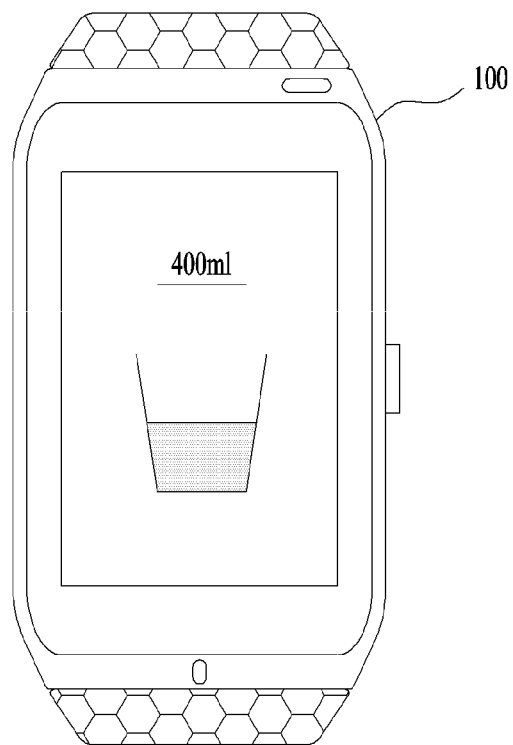

In case of outputting the guide screen that advises the user to drink water, as shown in an example of FIG. 16b, the controller 180 can also provide the user with information on an amount of water that the user should have. By doing so, the user can drink the right amount of water.

Moreover, when the controller advises the user to drink water, it may also consider a current weather condition. As an example, if current weather is hot or UV index is high, the controller 180 can more frequently advise the user to drink water compared to a usual day. Current weather information can be remotely received from a weather information providing server.

<Case 14—Advising User to Take a Rest>

Figure 17A:
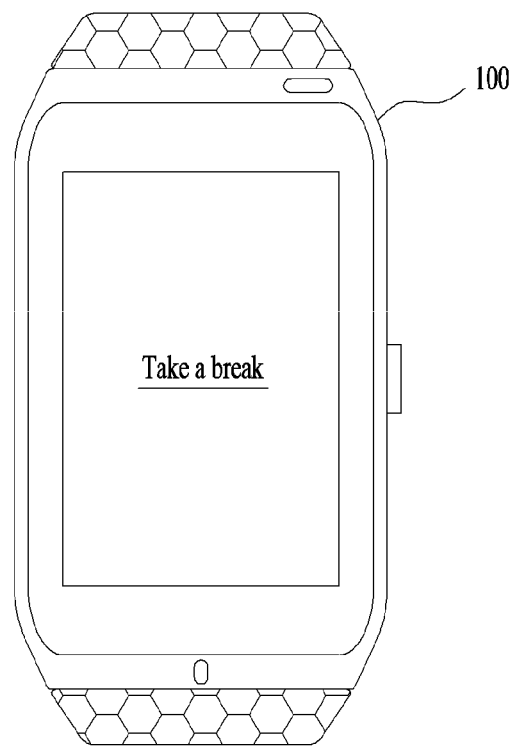

The present embodiment is explained in detail with reference to FIG. 17 in the following.

If a user works for a long time with a certain position, the mobile terminal 100 according to the present invention can advise the user to take a rest. Specifically, if the mobile terminal 100 does not move for a prescribed time although fingers are moving (e.g., movement of typing on a keyboard), the controller 180 can determine it as the user is working with an identical position for too much time, as shown in an example of FIG. 17a, the controller 180 outputs a guide screen advising the user to take a rest. In addition to the guide screen, the controller can control feedback of at least one selected from the group consisting of audio, vibration and wrist tightening to be outputted. In this case, the prescribed time, which is used for determining whether the user is working for a long time, can be configured in consideration of at least one of an age of the user and a health state of the user. For instance, if the user corresponds to an adult in twenties, the controller 180 is configured to advise the user to take a rest once in every one and a half hours. On the contrary, if the user corresponds to an adult in thirties or a sick person, the controller 180 can be configured to advise the user to take a rest once in every 40 minutes.

While advising the user to take a rest, the controller 180 may be able to play music (e.g., frequently played music) or may be able to remotely control a computer of the user to be switched to a sleeping mode.

As mentioned earlier in the case 1 to case 14, the mobile terminal according to the present invention can recommend actions necessary for the user in a manner of analyzing a behavior pattern of the user and a current state of the user. In this case, data necessary for the user (e.g., path information, weather information, information on food taken by the user etc.) can be received from an external server (e.g., a traffic management server, a weather information providing server, a food information providing server etc.).

According to one embodiment of the present invention, the aforementioned method (operation flowchart) can be implemented by codes readable by a processor in a medium in which a program is recorded. Examples of the medium readable by the processor includes a ROM, a RAM, a CD-ROM, a magnetic tape, a floppy disk, an optical data storing device and the like. The medium can also be implemented in a form of a carrier wave (e.g., transmission via the internet).

The mobile terminal 100 may be non-limited by a composition and method of the aforementioned embodiments. Instead, all or a part of each of the embodiments can be configured in a manner of being selectively combined with each other to enable the embodiments to be variously modified.

INDUSTRIAL APPLICABILITY

The present invention can be applied not only to a mobile terminal of watch-type but also to various wearable devices capable of being worn on a body.

What is claimed is:

1. A mobile terminal of watch-type to be worn on a wrist of a user, comprising:
   a display unit configured to display information;
   a sensing unit configured to detect movement of the mobile terminal;
   a memory configured to store a behavior pattern data of the user during a time slot; and
   if a time in which a prescribed action is expected to occur has arrived or an occurrence of the prescribed action is not detected based on the behavior pattern data although the time in which the prescribed action is expected to occur has passed, a controller configured to recommend an action to be performed by the user,
   wherein if it is determined that the user does not get up although a time in which the user is expected to get up has passed, the controller is configured to automatically output an alarm.

2. The mobile terminal of claim 1, wherein if it is determined that the user gets up, the controller is configured to control at least one of news, weather information, traffic situation information around the users schedule data of the user to be outputted via the display unit.

3. The mobile terminal of claim 1, wherein if it is determined that the user gets up, the controller is configured to remotely control at least one of a TV or an audio device to be turned on.

4. The mobile terminal of claim 1, further comprising a position-location module,
   wherein if it is determined that the mobile terminal is getting moved out of a home in morning hours, the controller is configured to control path information associated with a path to a place of duty or a school of the user to be displayed.

5. The mobile terminal of claim 4, wherein if an action related to the user having a meal is not detected before the mobile terminal is getting moved out of the home, the controller is configured to control restaurant information recommending a restaurant to the user to be further displayed.

6. The mobile terminal of claim 5, wherein if it is determined that the user will be unable to arrive at the place of duty or the school on time in consideration of an expected time to be taken by the user to the place of duty or the school, the controller is configured to omit the display of the restaurant information.

7. The mobile terminal of claim 1, wherein if a time in which the user is expected to usually have a meal has arrived or if it is determined that the user does not have a meal although the time at which the user is expected to usually have a meal has passed, the controller is configured to control a recommend screen recommending a restaurant to the user to be displayed.

8. The mobile terminal of claim 7, further comprising a position-location module configured to obtain location information of the mobile terminal,
   wherein the controller is configured to preferentially recommend a restaurant close to a current position of the mobile terminal to the user based on the location information.

9. The mobile terminal of claim 7, further comprising a camera configured to capture a surrounding image,
   wherein if it is determined that the user is having a meal, the controller is configured to control an image of food consumed by the user to be captured via the camera and control information on the food to be displayed via the display unit.

10. The mobile terminal of claim 1, wherein if a time in which the user is expected to usually take a medicine has arrived or if it is determined that the user does not take the medicine although the time in which the user is expected to usually take the medicine has passed, the controller is configured to recommend the user to take the medicine.

11. The mobile terminal of claim 1, wherein if it is determined that a temperature of the user is higher than a normal temperature, the controller is configured to control a recommend screen recommending a neighboring hospital to the user to be displayed.

12. The mobile terminal of claim 11, wherein if it is determined that the temperature of the user is higher than the normal temperature, the controller is configured to remotely activate at least one of an air cleaner, a cleaner, a heater or an air conditioner to develop indoor environment appropriate for the user.

13. The mobile terminal of claim 1, wherein if it is determined that the user is sleeping, the controller is configured to remotely control an electronic device located near the user to be automatically turned off.

14. The mobile terminal of claim 1, wherein if it is determined that the user is working, the controller is configured to execute a Do Not Disturb mode.

15. The mobile terminal of claim 1, wherein if the time in which the prescribed action is expected to occur has arrived or an occurrence of the prescribed action is not detected although the time in which the prescribed action is expected to occur has passed, the controller is configured to control feedback to be outputted.

16. The mobile terminal of claim 15, wherein the feedback corresponds to at least one of an output of vibration, an output of audio, or a tightening of the mobile device on the wrist of the user.

17. A method of controlling a mobile terminal of watch-type to be worn on a wrist of a user, comprising the steps of:
   collecting behavior information of the user from a sensing unit;
   generating a behavior pattern data of the user during a time slot by analyzing the behavior information of the user; and
   if a time in which a prescribed action is expected to occur has arrived or an occurrence of the prescribed action is not detected based on the behavior pattern data although the time in which the prescribed action is expected to occur has passed, recommending an action to be performed by the user,
wherein the method further comprises:
  if it is determined that the user does not get up although a time in which the user is expected to get up has passed, automatically outputting an alarm.

* * * * *